US006650832B2

(12) United States Patent
Masuda

(10) Patent No.: US 6,650,832 B2
(45) Date of Patent: Nov. 18, 2003

(54) VARIABLE POWER LENS BARREL AND CAMERA

(75) Inventor: Shinichi Masuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/055,670

(22) Filed: Jan. 23, 2002

(65) Prior Publication Data

US 2002/0141744 A1 Oct. 3, 2002

(30) Foreign Application Priority Data

Feb. 6, 2001 (JP) ........................ 2001-029578

(51) Int. Cl.$^7$ .................... G03B 17/00; G02B 15/14

(52) U.S. Cl. ........................................ 396/83; 359/700

(58) Field of Search ................ 396/72, 79, 83; 339/699, 700

(56) References Cited

U.S. PATENT DOCUMENTS 6,002,531 A * 12/1999 Nakashima et al. ........ 359/700

* cited by examiner

Primary Examiner—Russel Adams
Assistant Examiner—Arthur Smith
(74) Attorney, Agent, or Firm—Robin, Blecker & Daley

(57) ABSTRACT

The present invention discloses a variable power lens barrel including a first lens unit that is positioned nearest to the subject side, and a cam barrel having the first cam, wherein the first cam alternately and continuously has a plurality of variable power cam portions that drive the first lens unit for varying power thereof in the optical axis direction and a plurality of focus cam portions that drive the first lens unit driven by the respective variable power cam portions for focusing in the optical axis, and an amount of lift of the focus cam portion of the first cam, which drives the first lens unit, in the optical axis direction at the telephoto end is smaller than an amount of lift of the focus cam portion of the first cam, which drives the first lens unit, in the optical axis direction at other variable power positions.

6 Claims, 16 Drawing Sheets

VARIABLE POWER LENS BARREL AND CAMERA

BACKGROUND OF THE INVENTION

1. Field of the Invention

The present invention relates to a lens barrel, and in particular the invention relates to a lens barrel that moves a lens group by turning operations of a zoom ring in the optical axis direction and stops the same at a plurality of zoom positions, and at the same time, is capable of focusing adjustment from infinity to near distance. A lens barrel according to the invention is applicable to a camera for a 35 mm wide film and a digital camera, etc.

2. Description of the Related Art

A magnification varying unit that has been proposed in Japanese Patent No. Hei 6-100707 and a zoom position changing unit that has been proposed in Japanese Laid-Open No. Hei 9-80291 are capable of varying the power and focusing adjustment by turning operations of a single zoom ring.

FIG. 13 and FIG. 14 are general views of the major parts of a magnification varying unit that have been proposed in Japanese Patent No. Hei 6-100707, that is, views showing the relationship of a turning angle of the zoom ring and an amount of movement of a lens group in the optical axis direction. The power varying unit is composed of two lens groups and is capable of changing zoom positions and carrying out focusing adjustment by turning operations of the zoom ring.

101 denotes a positive lens unit, 102 denotes an aperture that is concurrently used as shutter blades, 103 denotes a negative lens unit, and 104 denotes an image pick-up plane. Herein, arrow C indicates an amount of movement of the positive lens unit 101 in the optical axis direction with respect to the turning angle of the zoom ring. Also, arrows M1 through M4 and arrows N1 through N3, respectively, indicate an amount of movement of the negative lens unit 103 in the optical axis direction with respect to the turning angle of the zoom ring.

When the zoom ring is located at a position where the turning angle is 0°, the positive lens unit 101, shutter blades 102 and negative lens unit 103 are located in such a relationship shown at the upper side in FIG. 1 through FIG. 13. That is, the power varying unit is at a short focal length (hereinafter called "WIDE") and the lens focusing is set to infinity (hereinafter called "∞").

Also, when the zoom ring is located at a position where the turning angle is 180°, the positive lens unit 101, shutter blades 102 and negative lens unit 103 are located in such a relationship as depicted at the underside in FIG. 13 with respect to the image pick-up plane 104. That is, the power varying unit is at a long-focal length (hereinafter called "TELE"), and at the same time, the lens focusing is set to ∞).

If the zoom ring is turned by 30° around the optical axis from a state where the lens focusing is set to ∞ at a zoom position of WIDE, the positive lens unit 101 is moved in the optical axis direction in compliance with the arrow C, and the negative lens unit 103 is moved in the optical axis direction based on the arrow M1. That is, where the turning angle of the zoom ring is in a range from 0° through 30°, the positive lens unit 101 and negative lens unit 103 are taken out in the optical axis direction with a fixed-spacing condition secured, whereby only a focusing adjustment to the near distance of the lens groups is carried out with the WIDE condition maintained. Herein, the lens is focused to the near distance when the zoom ring is positioned at a turning angle of 30°.

If the zoom ring is further turned around the optical axis, the positive lens unit 101 is moved in the optical axis direction in compliance with the arrow C, and at the same time, the negative lens unit 103 is moved in the optical axis direction based on the arrow N1, wherein, when the turning angle of the zoom ring is set to 60°, the lens group power is changed to a higher power by one rank.

If unit operator changes the mode to normal (NOM) mode in order to slightly further increase the magnification of the lens group, the zoom ring further turns to a position of 120°. Herein, when the zoom ring turning angle is positioned at 120°, the lens is set to ∞. And, as the zoom ring is further turned from the position of 120°, focusing is adjusted to the near distance in a range from the turning angle of 120° through 150°, wherein the zoom lens is located at a position where the turning angle is 150°, and the lens focusing is set to the point-blank position.

Further, if the zoom ring is turned to a turning angle position of 180°, the power varying unit is set to the telephoto end. At this time, the lens is focused to ∞. As the zoom ring is further turned from the position where the turning angle is 180°, the positive lens unit 101 is moved in the optical axis direction based on the arrow C, and at the same time, the negative lens unit 103 is moved in the optical axis direction on the basis of the arrow M4, wherein focusing adjustment to the near distance of the lens group is carried out. Herein, when the zoom ring turning angle is positioned at 240°, the lens is focused to the near distance.

With the above-described construction, the magnification varying unit carries out varying the power and focusing adjustment by only turning a single zoom ring.

In a power varying unit that has been proposed in Japanese Patent No. Hei 6-100707 and a zoom position changing unit that has been proposed in Japanese Laid-Open No. Hei 9-80291, the amount of protrusion of lens groups (such as a positive lens unit 101 and a negative lens unit 103) is large when the lens focusing is varied from ∞ to the near distance at the telephoto end. Herein, if the amount of protrusion is large, the length of a cam groove to guide the lens groups in the optical axis direction becomes longer in the optical axis direction, wherein since the length of the cam barrel in the optical axis direction, in which the cam groove is formed, is increased in line therewith, the size of the lens barrel is increased. Also, if the amount of protrusion of the lens groups is large, it becomes inconvenient to handle the lens barrel.

SUMMARY OF THE INVENTION

It is therefore an object of the present invention to provide a lens barrel, the size of which is reduced, and at the same time, which can be easily handled, by decreasing the amount of protrusion of lens groups by varying the amount of movement of the lens group (which is located nearest to the object side) in the optical axis direction when carrying out focusing adjustment at the TELE end.

In order to achieve the above-described object, a variable power lens barrel according to one aspect of the invention includes a first lens unit that is positioned nearest to the object side, and a cam barrel having a first cam, wherein the first cam alternately and continuously has a plurality of variable power cam portions that drive the above-described first lens unit for varying power thereof in the optical axis direction and a plurality of focus cam portions that drive the above-described first lens unit driven by the respective variable power cam portions for focusing in the optical axis.

Herein, an amount of lift of the focus cam portion of the above-described first cam, which drives the above-described first lens unit, in the optical axis direction at the telephoto end is smaller than an amount of lift of the focus cam portion of the above-described first cam, which drives the above-described first lens unit, in the optical axis direction at other variable power positions.

The variable power lens barrel according to the above aspect of the invention further includes a second lens unit that is positioned at the image plane side nearer than the above-described first lens unit.

A second cam is formed in the above-described cam barrel.

The second cam alternately and continuously has a plurality of variable power cam portions that drive the above-described second lens unit for varying power thereof in the optical axis direction and a plurality of focus cam portions that drive the above-described second lens unit driven by the respective variable power cam portions for focusing in the optical axis direction.

Herein, an amount of lift of the focusing cam portion of the above-described second cam, which drives the above-described second lens unit, in the optical axis direction at the telephoto end is smaller than an amount of lift of the focus cam portion of the above-described second cam, which drives the above-described second lens unit, in the optical axis direction at other variable power positions.

Also, the variable power lens barrel according to the above aspect of the invention further includes a second lens unit that is positioned at the image plane side nearer than the above-described first lens unit.

A second cam is formed in the above-described cam barrel.

The second cam alternately and continuously has a plurality of variable power cam portions that drive the above-described second lens unit for varying power thereof in the optical axis direction and a plurality of focus cam portions that drive the above-described second lens unit driven by the respective variable power cam portions for focusing in the optical axis direction.

Herein, the focusing cam portion of the second cam that drives the above-described second lens unit at the telephoto end is located in a variable power lens barrel that drives the above-described second lens unit at a nearer image plane side than the position of the above-described second lens unit that has been driven to the telephoto end by the variable power cam portion of the above-described second cam.

Further, the above-described cam barrel is movable in the optical axis direction.

The lens barrel has a drive member having a third cam.

The third cam alternately and continuously has a plurality of variable power cam portions that drive the above-described cam barrel for varying the power in the optical axis direction, and a plurality of focusing cam portions that drive the above described cam barrel driven by the respective variable power cam portions for focusing in the optical axis direction.

Herein, the amount of lift of the focusing cam portion of the above-described third cam in the optical axis direction, which drives the above-described cam barrel at the telephoto end, is smaller than the amount of light of the focusing cam portion of the above-described third cam, which drives the above-described cam barrel at other power varying positions.

Still further features will be made apparent from the following drawings and description.

DESCRIPTION OF THE PREFERRED EMBODIMENTS

Figure 1:
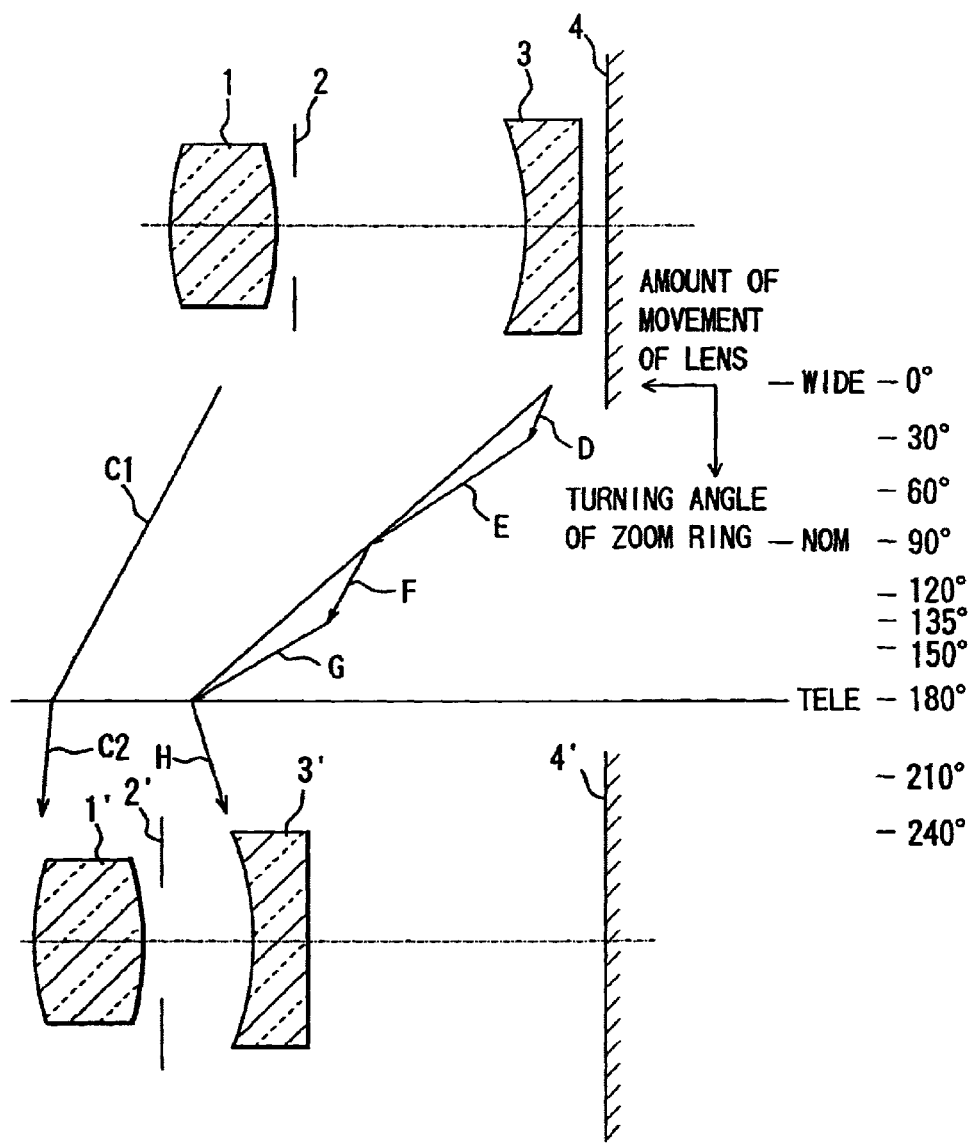
FIG. 1 is an exemplary view expressing movement of a photographic lens according to a first embodiment of the present invention.

FIG. 1 is a view showing a relationship between a turning angle of a zoom lens (not illustrated) and an amount of a photographic lens in the optical axis direction. Herein, 1 denotes a positive lens unit, 2 denotes an aperture, which is concurrently a shutter blade, 3 denotes a negative lens unit, and 4 denotes an image plane.

Arrows C1 and C2 indicate amounts of shift of the positive lens unit 1 in the optical axis direction with respect to the turning angle of the zoom ring. Also, arrows D through H indicate amounts of shift of the negative lens unit 3 in the optical axis direction with respect to the turning angle of the zoom ring.

Where the zoom ring is located at a turning angle of 0°, the positive lens unit 1, shutter blade 2 and negative lens unit 3 are located in such a relationship as shown in the drawing depicted at the middle of FIG. 1, with respect to the image plane 4. At this time, the zoom position is WIDE and the lens focusing is set to ∞.

If the zoom ring is turned, the positive lens unit 1 moves in the optical axis direction on the basis of the arrow C until the turning angle becomes 30°, and at the same time, the negative lens unit 3 moves in the optical axis direction on the basis of the arrow D. Where the turning angle of the zoom ring is in a range from 0° through 30°, the positive lens unit 1 and negative lens unit 3 protrude with a fixed spacing secured in the optical axis direction. That is, where the turning angle of the zoom ring is in a range from 0° through 30°, the focusing adjustment of the lens group is carried. Herein, where the zoom ring is located at a turning angle of 30°, the zoom position is WIDE, and the lens focus is set to near distance.

If the zoom ring is further turned from a position where the turning angle is 30°, the positive lens unit 1 moves in optical axis direction on the basis of the arrow C1, and at the same time, the negative lens unit 3 moves in the optical axis direction on the basis of the arrow E, wherein the zoom ring is turned to a position where the turning angle is 90°, and the power of the lens group is changed to a one-step higher power side. Herein, where the zoom ring is located at a position where the turning angle is 90°, the zoom position is NOM (an intermediate power ratio between the TELE end and the WIDE end), and the lens focusing is set to ∞.

If the zoom ring, which is located at a position where the turning angle is 90°, is further turned, the positive lens unit 1 moves in the optical axis direction on the basis of the arrow C1 until the turning angle of the zoom ring becomes 135°, and at the same time, the negative lens unit 3 moves in the optical axis direction on the basis of the arrow F. Herein, where the turning angle of the zoom ring is in a range from 90° through 135°, the interval between the positive lens unit 1 and the negative lens unit 3 is fixed in the optical axis direction, wherein the lens group is subjected to focusing adjustment.

If the zoom ring, which is located at a position where the turning angle is 135°, is further turned, the positive lens unit 1 moves in the optical axis direction on the basis of the arrow C1, and simultaneously, the negative lens unit 3 moves in the optical axis direction on the basis of the arrow G, wherein the power of the lens groups is changed to the power at the TELE end by turning of the zoom ring to a position where the turning angle is 180°. Herein, where the zoom ring is located at a position where the turning angle is 180°, the zoom position is TELE, and the lens focusing is set to ∞.

If the zoom ring, which is located at a position where the turning angle is 180°, is further turned, the positive lens unit 1 moves in the optical axis direction on the basis of the arrow C2 and protrudes to a position 1' in FIG. 1, and simultaneously, the negative lens unit 3 moves in the optical axis direction on the basis of the arrow H and is stowed into a position 3' in FIG. 1. Herein, an amount of movement of the positive lens unit 1, which is located at the extremely front position of the lens barrel, in the optical axis direction is smaller than the amount of movement at the arrow C1 in the optical axis direction. Also, an amount of movement of the negative lens unit 3 in the optical axis direction at the arrow H is set so that the lens focusing is set to the near distance side with respect to an amount of movement (at the arrow C2) of the positive lens unit 1 in the optical axis direction. That is, in the present embodiment, the negative lens unit 3 is located at the TELE end and is stowed to the image plane 4 side beyond the position of the negative lens unit 3, wherein the focusing adjustment can be carried out by slight protruding of the positive lens unit 1. And, as described above, the first cam groove 6b and the second cam groove 6c alternately and continuously have a plurality of power-varying areas and focal adjustment areas that drive the lens unit which is driven by the respective power-varying areas.

Figure 2:
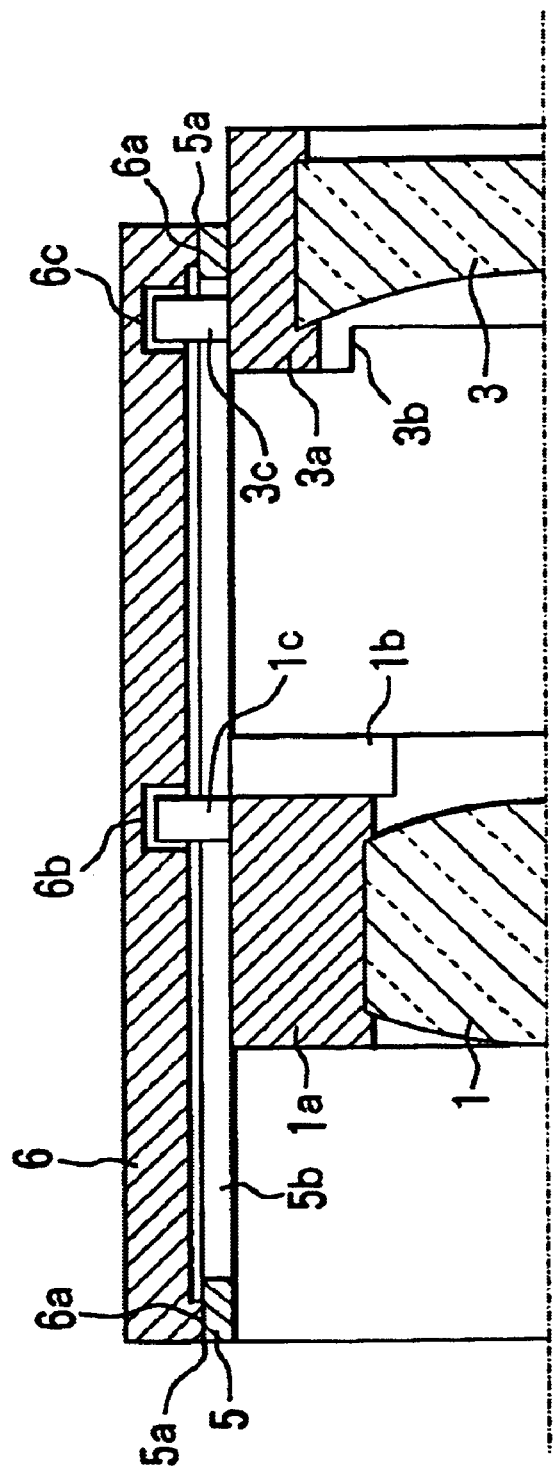
FIG. 2 is a partially sectional view of a lens barrel according to the first embodiment.

Next, a description is given of a structure of the lens barrel according to the present embodiment with reference to FIG. 2.

The positive lens unit 1 is held at a positive lens frame 1a, and a notched part 1b is formed at the positive lens frame 1a, and at the same time, a convex-shaped pin 1c is formed on the outer circumference of the positive lens frame 1a. The pin 1c passes through a linear groove 5b that is formed at a fixing barrel 5 described later, and is engaged with the first cam groove 6b that is formed on a zoom ring 6 described later.

The negative lens unit 3 is held at a negative lens frame 3a, a protrusion 3b extending in the optical axis direction is formed on the negative lens frame 3a, and at the same time, a convex-shaped pin 3c is formed on the outer circumference of the negative lens frame 3a. The pin 3c passes through a linear groove 5b that is formed on a fixing barrel 5 described later, and is engaged with the second cam groove 6c that is formed on the zoom ring 6 described later. Herein, although the pin 1c and pin 3c pass through one linear groove 5b, two linear grooves 5b are formed on the fixing groove 5, and the pin 1c and pin 3c may be, respectively, passed through the respective linear grooves. Also, by forming a notched part 1b on the positive lens frame 1a, it is possible to prevent the positive lens frame 1a from interfering with the protrusion 3b of the negative lens frame 3a.

5 denotes a fixing barrel in which the positive lens frame 1a and the negative lens frame 3a are accommodated, and a linear groove 5b extending in the optical axis direction is formed therein.

6 denotes a zoom ring that can be changed to WIDE, NOM and TELE by a photographer turning the same with a drive force of a motor (not illustrated) in response to operations of a zoom switch (not illustrated), and the same is disposed so as to be rotatable around the optical axis on the outer circumference of the fixing barrel 5. Cam grooves 6b and 6c are formed on the inner circumference of the zoom ring 6. The pin 1c is engaged with the first cam groove 6b while the pin 3c is engaged with the second cam groove 6c. If the zoom ring 6 is turned by a photographer in the optical axis direction, the pins 1c and 3c are, respectively, guided by the first cam groove 6b and the second cam groove 6c and are caused to move in the optical axis direction, whereby the positive lens unit 1 and the negative lens unit 3, respectively, move in the optical axis direction, and stop at respective zoom positions of WIDE, NOM, and TELE.

Also, the zoom ring 6 is driven and rotated by a motor (not illustrated) in the optical axis direction on subject distance information that is outputted from a subject distance detecting unit (not illustrated), and the same causes the positive lens unit 1 and the negative lens unit 3 to respectively move in the optical axis direction, wherein focusing adjustment is carried out at any zoom position of WIDE, NOM and TELE.

Herein, the first cam groove 6b is formed and shaped so that the positive lens unit 1 is caused to move in the optical axis direction subject to the arrows C1 and C2. That is, the first cam groove 6b has an inflection point at TELE, wherein the same is formed so that an amount of lift of a focusing adjustment area (an area corresponding to the arrow C2) at TELE in the first cam groove 6b is made smaller than an amount of lift of the focusing adjustment area (a focusing adjustment area of an area corresponding to the arrow C1) at other zoom positions in the optical axis direction. Also, the second cam groove 6c is formed and shaped so that the negative lens unit 3 is caused to move in the optical axis direction subject to the arrows D through H. That is, the cam groove 6c has an inflection point at TELE, and the same is formed so that the negative lens unit 3 is stowed in a focusing adjustment area (an area corresponding to the arrow H) at TELE, and at the same time, the negative lens unit 3 protrudes at a focusing adjustment area (an area corresponding to the arrows D and F) at other zoom positions.

Figure 3:
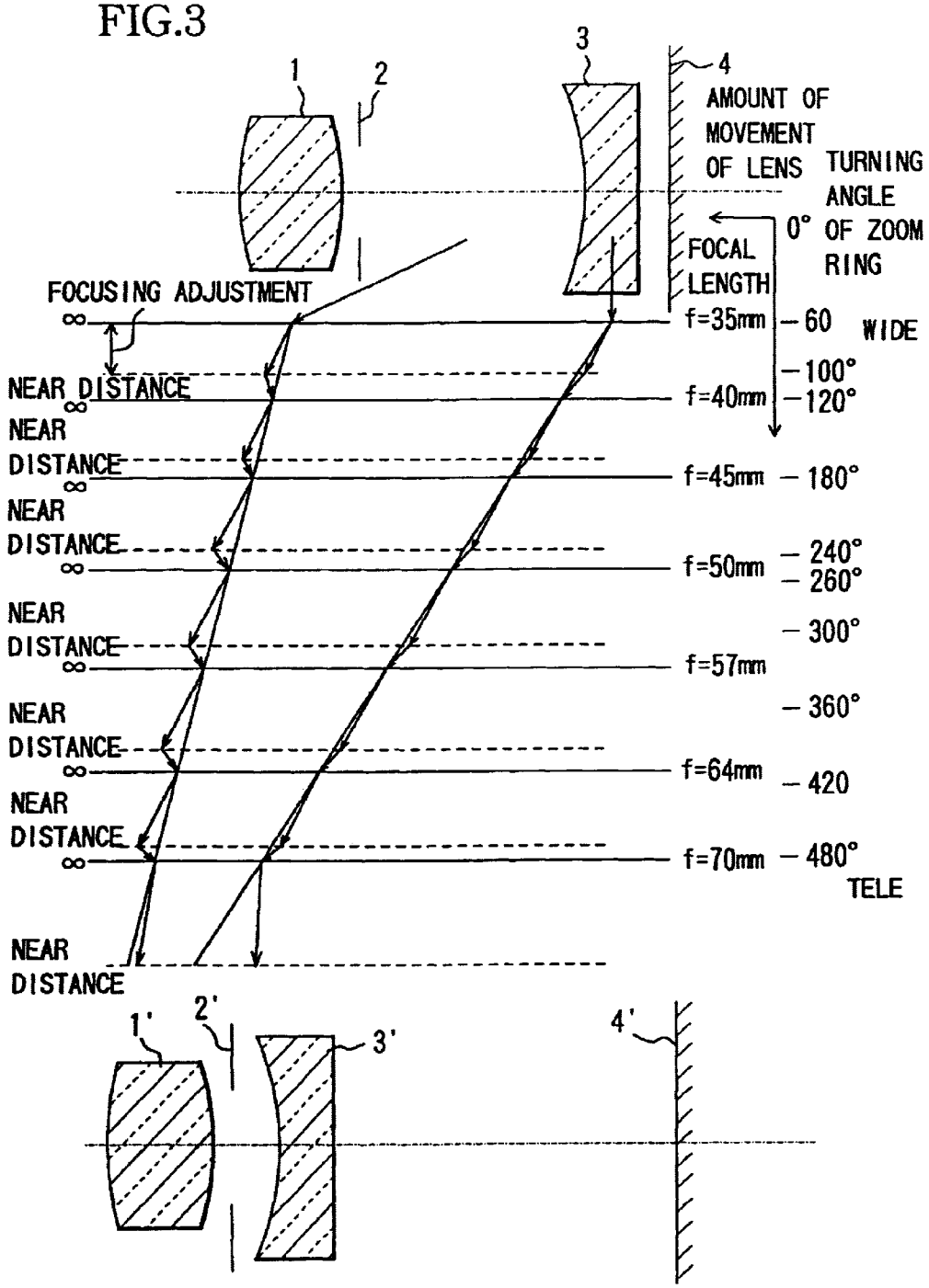
FIG. 3 is an exemplary view showing movement of a photographic lens according to a second embodiment of the invention.

FIG. 3 is a view showing a relationship between a turning angle of a zoom ring (not illustrated) and an amount of movement of a photographing lens (not illustrated) in the optical axis direction in a lens barrel according to another embodiment of the invention. Also, the construction of the lens barrel according to the present embodiment is similar to that of the lens barrel according to the above-described embodiment, wherein components which are common to those in the above-described embodiment are given the same reference numbers as those in the above-described embodiment. Herein, 1 denotes a positive lens unit, 2 is an aperture that is concurrently used as shutter blades, 3 denotes a negative lens unit, and 4 denotes an image plane. In the present embodiment, the lens unit can be changed to seven zoom positions (f=35, 40, 45, 50, 57, 64 and 70 mm) in the focal length (f=35 mm through 70 mm).

If the zoom ring is turned from a position where the turning angle is 0° to a position where the turning angle is 60°, the positive lens unit 1 protrudes in the optical axis direction with the negative lens unit 3 remaining at a fixed position on the optical axis, and the positive lens unit 1, negative lens unit 3 paid out, shutter blades 2 are made into a positional relationship as has been depicted on the upper side in FIG. 3 with respect to the image plane 4. At this time, the lens focusing is set to ∞ at f=35 mm.

If the zoom ring is further turned to a position where the turning angle is 60°, the positive lens unit 1 and the negative lens unit 3 protrude in the optical axis direction with a fixed-spacing condition remaining therebetween until the turning angle becomes 100°. That is, focusing adjustment of the lens group is carried out in a range where the turning angle of the zoom ring 6 is 60° through 100°. Herein, when the zoom ring is located at a position where the turning angle is 100°, the lens focusing is set to the near distance at f=35 mm.

And, if the zoom ring is further turned from a position where the turning angle is 100°, the positive lens unit 1 is stowed to the image plane side, and at the same time, the negative lens unit 3 protrudes the subject side (not illustrated), wherein with the zoom ring turning to a position where the turning angle is 120°, the focal length is changed to f=40 mm. Herein, when the zoom ring is located at a position where the turning angle is 120°, the lens focusing is set to ∞ at f=40 mm.

As in the above-described operations, the zoom position is changed to f=40, 45, 50, 57, 64 and 70 mm subject to the turning angles of the zoom ring, and the focusing adjustment can be carried out at the respective zoom positions.

If the zoom ring is turned to a position where the turning angle is 480°, the lens focusing is set to ∞ at f=70 mm. And, if the zoom ring is further turned, the positive lens unit 1 and the negative lens unit 3 protrude while opening the interval in the optical axis direction. That is, an amount of movement of the positive lens unit 1 in the optical axis direction at the focusing adjustment of f=70 mm is smaller than an amount of movement of the positive lens unit 1 in the optical axis direction at the focal adjustment of other zoom positions (f=35 mm through 64 mm). That is, an amount of cam lift of the focusing adjustment area in the optical axis direction at the TELE end in the first cam groove 6b that drives the positive lens unit 1 and the second cam groove 6c that drives the negative lens unit 3 is smaller than an amount of cam lift at the focusing adjustment areas at other zoom positions. Also, the amount of movement of the negative lens unit 3 in the optical axis direction is set so that the lens focusing is set from ∞ to the near distance with respect to the amount of movement of the positive lens unit 1 in the optical axis direction.

Therefore, the focus is adjusted from ∞ to the near distance at f=70 mm. Herein, the view depicted at the lower side in FIG. 3 shows a relationship among the positive lens unit 1', shutter blades 2' and negative lens unit 3' with respect to the image plane 4' when the lens is focused to the near distance at f=70 mm.

Also, in the present embodiment, the amounts of movement of the positive lens unit 1 and the negative lens unit 3 in the optical axis direction are varied in comparison with a case where the focusing adjustment is carried out at other focal lengths when carrying out focusing adjustment at f=70 mm. However, the amounts of movement of the positive lens unit 1 and the negative lens unit 3 in the optical axis direction may be varied when carrying out focusing adjustment at other zoom positions (f=35 mm through 64 mm).

Figure 4:
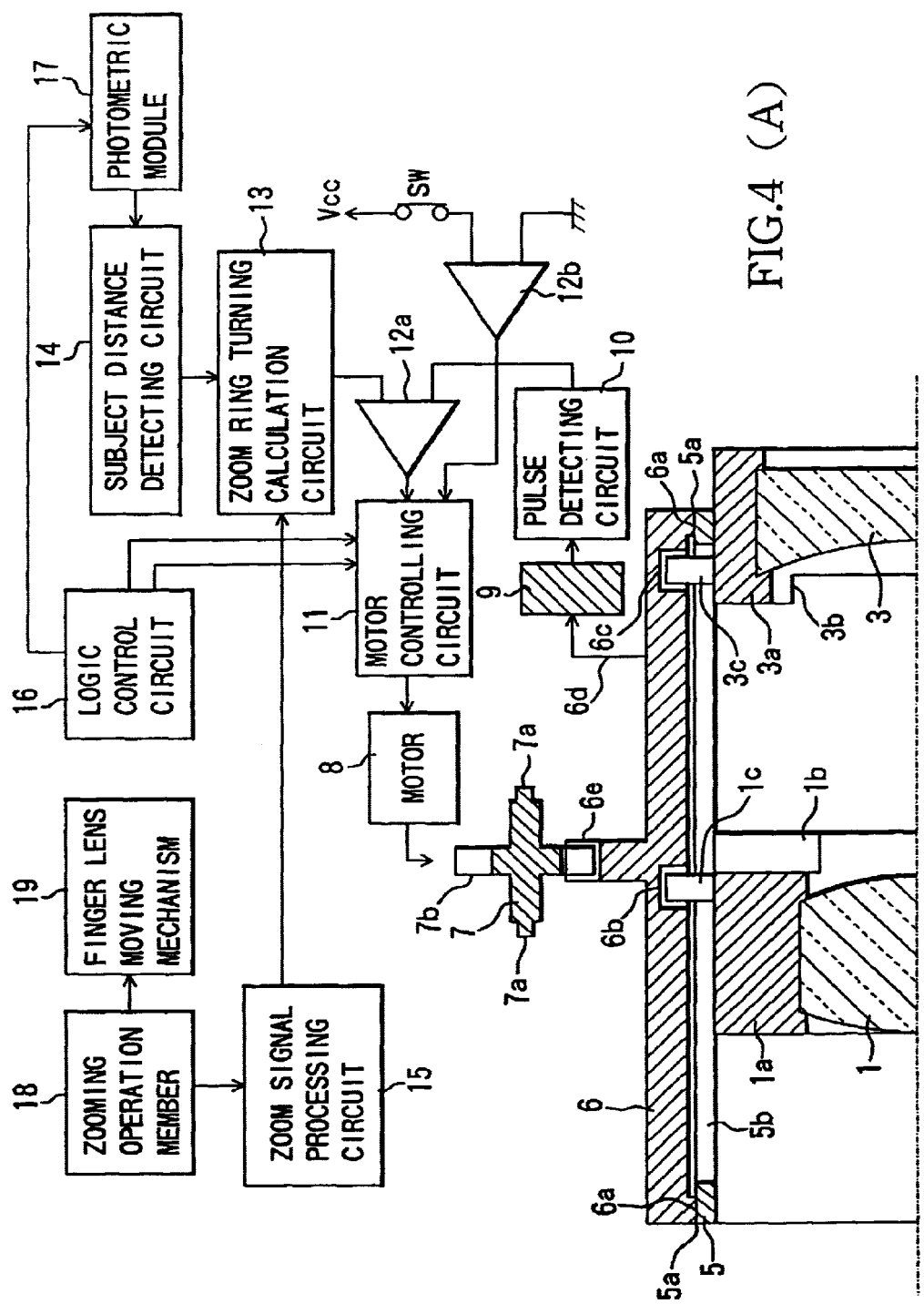
FIG. 4(A) shows a partially sectional view and a circuit diagram (WIDE) of a lens barrel according to the second embodiment.
FIG. 4(B) shows a partially sectional view and a circuit diagram (TELE) of a lens barrel according to the second embodiment.
Figure 4:
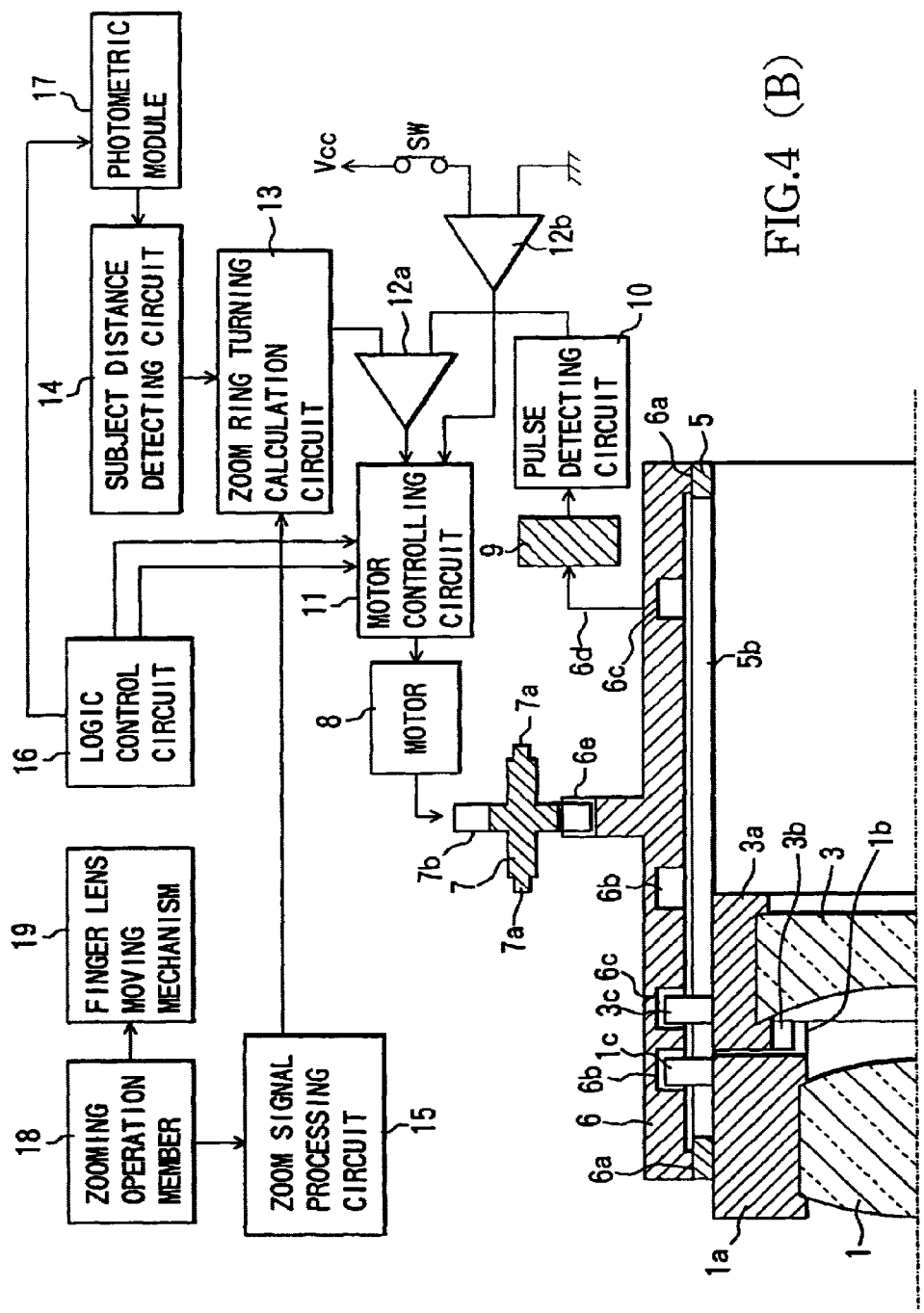

FIG. 4 shows a sectional view of a lens barrel according to the present embodiment and a block diagram showing the inside of a camera body provided with the lens barrel. Herein, FIG. 4(A) shows a state where the lens group (positive lens unit 1 and negative lens unit 3) are located at a zoom position of f=35 mm, and FIG. 4(B) shows a state where the lens group is located at a zoom position of f=70 mm.

The positive lens unit 1 is held at the positive lens frame 1a, a notched part 1b is formed at the positive lens frame 1a, and at the same time, a convex-shaped pin 1c is formed on the outer circumference of the positive lens frame 1a. The pin 1c passes through a linear groove 5b that is formed at the fixing barrel 5 described later, and the same is engaged with the first cam groove 6b that is formed at the zoom ring 6 described later.

The negative lens unit 3 is held at the negative lens frame 3a, a protrusion 3b extending in the optical axis direction is formed at the negative lens frame 3a, and at the same time, a convex-shaped pin 3c is formed on the outer circumference of the negative lens frame 3a. The pin 3c passes through the linear groove 5b that is formed at the fixing barrel described later, and is engaged with the second cam groove 6c that is formed at the zoom ring 6 described later, wherein although the pin 1c and pin 3c pass through one linear groove 5b, two linear grooves 5b are formed on the fixing barrel 5, and the pin 1c and pin 3c may be, respectively, passed through each of the linear grooves 5b.

The above-described cam grooves 6b and 6c, respectively, guide the pin 1c (positive lens unit 1) and pin 3c (negative lens unit 3) in the optical axis direction in line with the turning of the zoom ring 6 around the optical axis. The first and second cam grooves 6b and 6c are, respectively, formed and shaped so that the positive lens unit 1 and the negative lens unit 3 are caused to move by amounts of movement, in the optical axis direction, shown in FIG. 3. That is, the first cam groove 6b has an inflection point at f=70 mm, and the first cam groove 6b is formed so that an amount of lift of the focusing adjustment area in the optical axis direction at f=70 mm of the first cam groove 6b is made smaller than the amount of lift of the focusing adjustment area in the optical axis direction at other zoom positions. Further, the second cam groove 6c has an inflection point at f=70 mm, and the second cam groove 6c is formed so that an amount of lift of the focusing adjustment area in the optical axis direction at f=70 mm of the second cam groove 6c is made smaller than the amount of lift of the focusing adjustment area in the optical axis direction at other zoom positions.

5 denotes a fixing barrel in which the positive lens frame 1a and the negative lens frame 3a are accommodated, and a linear groove 5b extending in the optical axis direction is formed thereon.

6 denotes a zoom ring that is disposed so as to be rotatable around the optical axis on the outer circumference of the fixing barrel 5. The first and second cam grooves 6b and 6c are formed on the inner circumference of the zoom ring 6. In addition, a gear portion 6e is formed on the outer circumference of the zoom ring 6, and a connection piece 6d that transmits rotations of the zoom ring 6 to a pulse plate 9 described later is formed thereon.

7 denotes a gear that is rotatably supported on the camera body by a gear shaft 7a. The gear 7 is engaged with the gear portion 6e of the zoom ring 6 and is interlocked with a motor 8 via the reduction gear row (not illustrated).

9 denotes a pulse plate that is formed like a donut-shaped disk. A pattern with which the connection piece 6d of the zoom ring 6 is brought into contact is formed on the surface of the pulse plate 9. 10 denotes a pulse detection circuit, which detects a pulse from the pulse plate 9 and transmits the detected pulse to a comparator 12a.

11 denotes a motor controlling circuit, which is constructed so as to form a current flowing circuit for normal rotations of the motor by outputs of the comparator 12a, and is constructed so as to form a current flowing circuit for reversing of the motor by outputs of a comparator 12b. And, the motor 8 is normally rotated or reversed upon receiving a motor start signal from a logic control circuit 16 described later.

13 denotes a calculation circuit for turning of the zoom ring. The calculation circuit 13 carries out calculations shown in Table 1 below upon receiving signals from a subject distance detecting circuit 14 described later and a zoom signal detecting circuit 15. 14 is a subject distance detecting circuit (focusing adjustment signal outputting circuit). The subject distance detecting circuit 14 digitizes subject distance information that is obtained from a photometric module 17 described later and transmits the digitized signals to the zoom ring turning calculation circuit 13.

15 denotes a zoom signal detecting circuit, which digitizes position signals of a zooming operation member 18 described later as shown in Table 1 below, and inputs the same in the calculation circuit 13 for turning of the zoom ring.

16 denotes a logic control circuit that makes ready the current flowing circuit for normal rotations of a motor of the motor controlling circuit 11 by a photographer pressing a release button (not illustrated) to the first stroke. Also, by a photographer releasing a pressing operation of the release button, the current flowing circuit for reversing of a motor of the motor controlling circuit 11 is made ready. In addition, when a photographer presses the release button to the first stroke, the logic control circuit 16 issues a start signal to the photometric module 17, and issues a motor start signal to the motor controlling circuit 11 after a sufficient period of time to finish a photometric motion by the photometric module 17 elapses.

17 denotes a photometric module that measures a subject distance upon receiving a start signal from the logic control circuit 16 and transmits the subject distance information to the subject distance detecting circuit 14. 18 denotes a zooming operation member that is operated to change a zoom position (power). 19 denotes a finder lens moving mechanism that moves a finder lens into the optical axis direction, described later, upon receiving an operation of the zooming operation member 18, and changes the power so as to correspond the power of a photographing lens (the positive lens unit 1 and negative lens unit 3).

Figure 5:
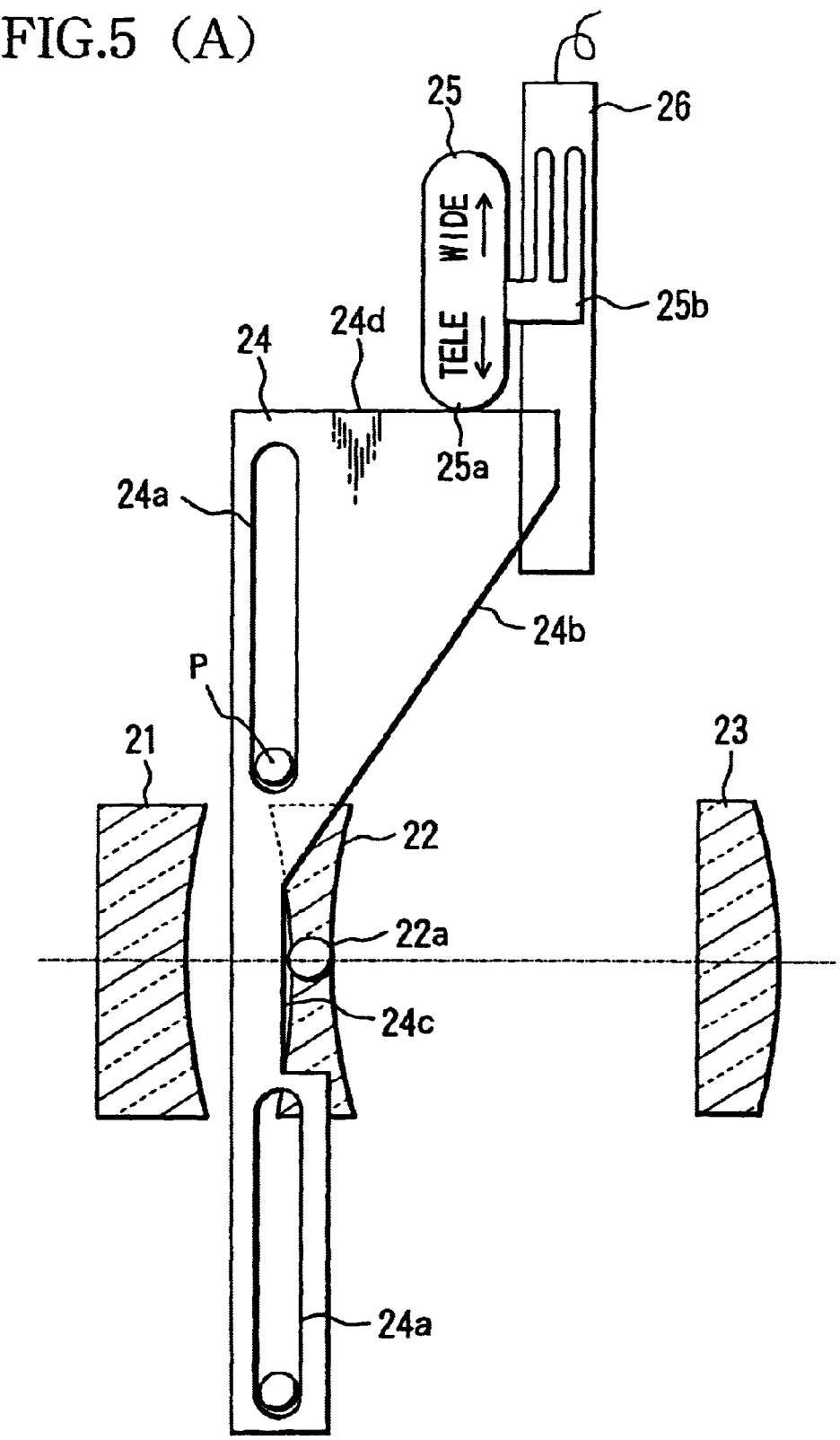
FIG. 5(A) is an exemplary view (WIDE) of a finger lens moving mechanism 19.
FIG. 5(B) is an exemplary view (TELE) of a finger lens moving mechanism 19.
Figure 5:
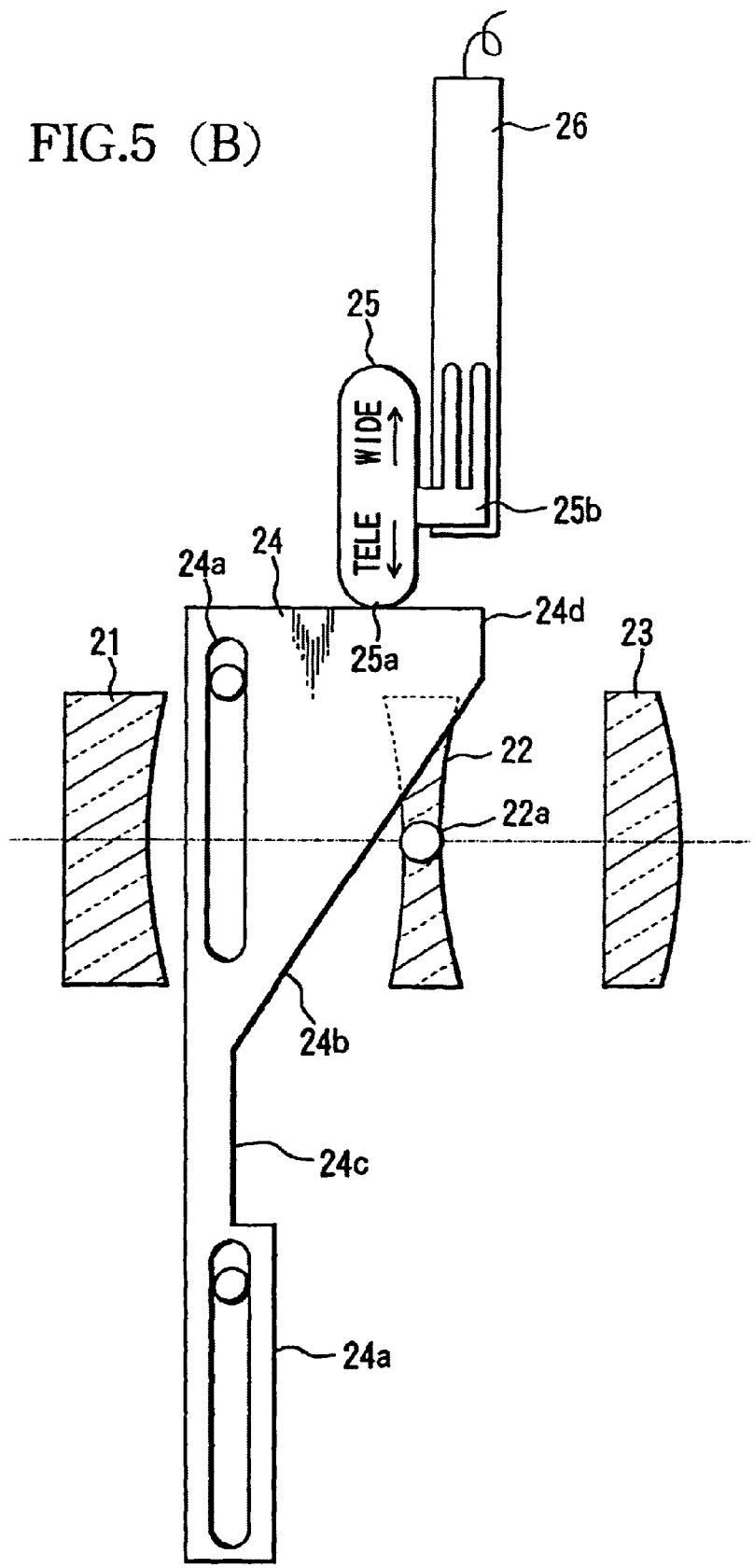

FIG. 5 shows a structure of the zooming operation member 18 and that of the finder lens moving mechanism 19. Herein, FIG. 5(A) shows a state where the finder lens is located at a zoom position of f=35 mm, and FIG. 5(B) shows a state where the finder lens is located at a zoom position of f=70 mm.

21 denotes a subject lens, 22 denotes a movable lens, and 23 denotes an eyepiece lens. A convex-shaped zoom pin 22a is formed on the movable lens 22, and the zoom pin 22a is pressed to the side of a zooming cam lever 24 described later by a spring (not illustrated).

24 denotes a zoom cam lever that causes the movable lens 22 to move in the optical axis direction, and is provided with a cam portion 24b, an idling portion 24c, and an end face portion 24d. A long slot 24a extending in the direction (the up and down direction in FIG. 5) orthogonal to the optical axis is formed at the zoom cam lever 24. By a pin P, which is formed at the camera body, being engaged with the long slot 24a, the zoom cam lever 24 is held so as to slide in the up and down direction in the drawing. Also, the zoom cam lever 24 is pressed by a spring (not illustrated) in the upward direction in FIG. 5.

25 denotes a zooming operation knob which is operated by a photographer. The zooming operation knob is slidable in the up and down direction in FIG. 5 with adequate friction applied. Herein, in the present invention, it is possible to change the zoom position to seven points in a range from f=35 mm through 70 mm by making a sliding operation of the zooming operation knob 25. The zooming operation knob 25 is brought into contact with the end face portion 24d of the zoom cam lever 24 at the lower end portion 25a thereof. It is possible to slide the zoom cam lever 24 in the up and down direction in FIG. 5 by making a sliding operation of the zooming operation knob 25, whereby the zoom pin 22a of the movable lens 22 is guided by the cam portion 24b of the zoom cam lever 24, and the movable lens 22 is caused to move in the optical axis direction. Also, the zooming operation knob 25 is provided with a connection piece 25b that moves in line with sliding of the zooming operation knob 25.

26 denotes a resistor pattern that is formed on a substrate (not illustrated), and is electrically connected to a zoom signal processing circuit 15 shown in FIG. 4. The resistor pattern 26 generates position signals of the zooming operation knob 25 by the connection piece 25b sliding on the resistor pattern 26 upon receiving a sliding operation of the zooming operation knob 25. The position signal is transmitted to the zooming signal processing circuit 15.

Figure 6:
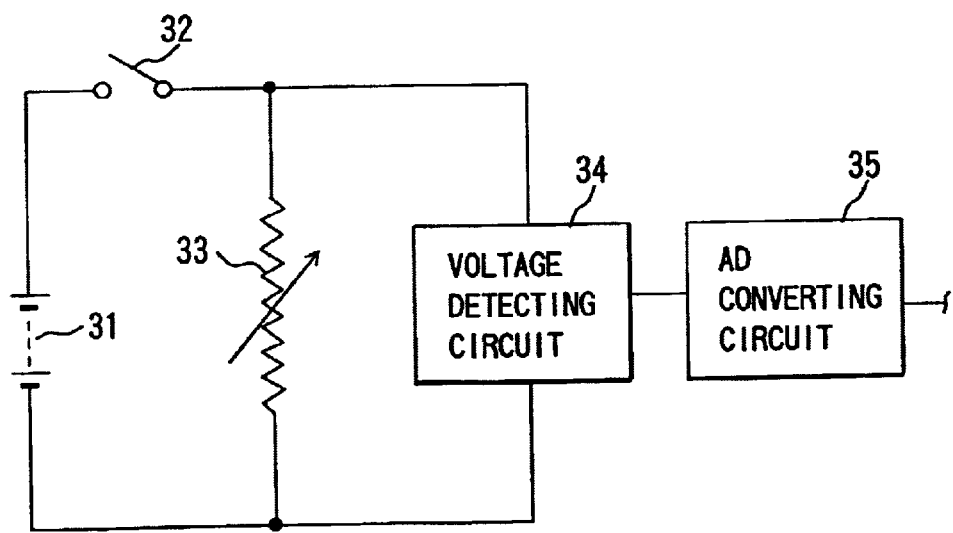
FIG. 6 is a circuit diagram of a zoom signal processing circuit 15.

FIG. 6 shows a detailed view of the zoom signal processing circuit 15 in FIG. 4. 31 denotes a source power of a camera, 32 denotes a switch that is interlocked with a release button, and 33 denotes a variable resistor that is composed of the above-described resistor pattern 26 and connection piece 25b. 34 denotes a voltage detecting circuit that converts a resistance value, which comes from the voltage detecting circuit 34, to figures shown in Table 1 below, and the converted signals are transmitted to the calculation circuit 13 for turning of a zoom ring.

In the above-described construction, a description is given of the power change of a camera provided with a lens barrel according to the invention and focusing adjustment thereof.

If a photographer holds a camera, peeps into the finder, and makes a sliding operation of the zooming operation knob 25, the zoom cam lever 24 slides to cause the movable lens 22 to move in the optical axis direction. Thereby, it becomes possible to change the power of the finger optical system to seven points in a range from f=35 mm through 70 mm. On the other hand, if the zooming operation knob 25 is caused to slide, a brush 25b of the zooming operation knob slides on the resistor pattern 26, and the resistance value of the variable resistor 33 is set.

And, if a photographer presses the release button to the first stroke, the switch 32 is turned on, and the photometric module 17 that has received a signal from the logic control circuit 16 measures a subject distance. The subject distance information brought about by the photometric module 17 is transmitted to the subject distance detecting circuit 14 and is made into a digital signal. After that, the digital signal is then transmitted to the calculation circuit 13 for turning of the zoom ring.

Also, if the release button is pressed to the first stroke, the switch 32 is closed, and the resistance value that is produced in a variable resistor 33 is converted to a voltage value in the voltage detecting circuit 34. After that, the voltage value is transmitted to an AD converting circuit 35, and the voltage value is made into a digital signal by the AD converting circuit 35. The digital signal is sent to the calculation circuit 13 for turning of the zoom ring as an output of the zoom signal processing circuit 15.

And, the calculation circuit 13 for turning of the zoom ring carries out calculations shown in Table 1 below upon receiving an output signal from the subject distance detecting circuit 14 and zoom signal processing circuit 15. For example, in a case where the zooming operation member 18 (zooming operation knob 25) is slid to a position of f=50 mm by an operation made by a photographer and the subject distance is measured to be 4 m by the photometric module 17, the calculation circuit 13 for turning of the zoom ring carries out calculations shown in Table 1, and stores 41 figures, in which both numbers are combined, in memory as reference values of the comparator 12a.

TABLE 1

| Focal length of lens (f) | Output signal from the zooming signal processing circuit 15 | Output signal from the subject distance detecting circuit 14 | | Input signal into the comparator 12a |
|---|---|---|---|---|
| 35 mm | 10 | 8 m | 0 | 10 |
|  |  | 4 m | 1 | 11 |
| 40 mm | 20 | 8 m | 0 | 20 |
|  |  | 0.6 m | 9 | 29 |
| 50 mm | 30 | 8 m | 0 | 30 |
|  |  | 0.6 m | 9 | 39 |
| 70 mm | 40 | 8 m | 0 | 40 |
|  |  | 4 m | 1 | 41 |
|  |  | 0.6 m | 9 | 49 |
| 105 mm | 50 | 8 m | 0 | 50 |
|  |  | 0.6 m | 9 | 59 |

On the other hand, the motor controlling circuit 11 normally turns the motor 8 upon receiving a start signal from the logic control circuit 16 and turns the zoom ring 6 around the optical axis, whereby the photographing lens (positive lens unit 1 and negative lens unit 3) moves in the optical axis direction (from WIDE to TELE).

The turning of the zoom ring 6 is made into a pulse and is outputted to the pulse detecting circuit 10, and the pulse is detected by the pulse detecting circuit 10. Then, the pulse is transmitted to the comparator 12a. Herein, the number of pulses is ten where the positive lens unit protrudes from the collapsible position to the position of f=35 mm.

Pulses are detected by the pulse detection circuit 10 while the zoom ring 6 is being turned by normal rotations of the motor 8. If the number of pulses becomes 41 pulses (the reference value of the comparator 12a, which has been calculated in the calculation circuit 13 for turning of the zoom ring), a signal to finish normal rotation of the motor 8 is issued to the motor controlling circuit 11 by reversing the comparator 12a, and the motor controlling circuit 11 actuates an electric brake for the motor 8 by short-circuiting both ends of the motor 8 and stops normal rotations of the motor 8. At this time, the turning angle of the zoom ring 6 becomes roughly 260°.

Thereafter, if the photographer presses the release button to the second stroke, the shutter operates to cause an exposure action to be carried out with respect to a silver film (not illustrated) that is positioned on an image plane 4. If the pressing of the release button is cancelled, and the release button is reset to the original position, the motor controlling circuit 11 reversely rotates the motor 8 upon receiving a start signal from the logic control circuit 16, whereby the zoom ring 6 turns in the WIDE direction. And if the zoom ring reaches a position of f=35 mm (turning angle: 60°), the switch SW is turned of f, whereby the comparator 12b is reversed to cause the motor 8 to stop its rotating (reversing).

Then, a film is wound by one frame, and the camera is reset to a state before the release button is pressed.

Also, in the present embodiment, although the zoom ring is set so that the zoom position can be changed to seven points in a range from f=35 mm through f=70 mm, the number of zoom positions may be increased or decreased.

Further, in the present embodiment, by providing the pulse plate 9 and the pulse detecting circuit 10, and detecting the turning angle (the positional relationship between the positive lens unit 1 and negative lens unit 3 in the optical axis direction) of the zoom ring 6, the rotation stopping time of the motor 8 is determined. However, the embodiment is not limited to this. That is, the pulse motor, which is employed as the motor 8 is turned in response to the number of output pulses from the calculation circuit 13 for turning of the zoom ring, and the zoom ring 6 is turned to a position of an appointed turning angle, and the rotation stopping time of the motor 8 may be determined. If so, signals from the calculation circuit 13 for turning of the zoom ring may be inputted directly into the motor controlling circuit 11. Therefore, it does not become necessary to provide the camera body with a pulse plate 9, a pulse detecting circuit 10 and a comparator 12a, wherein it is possible to make the camera small-sized.

Figure 7:
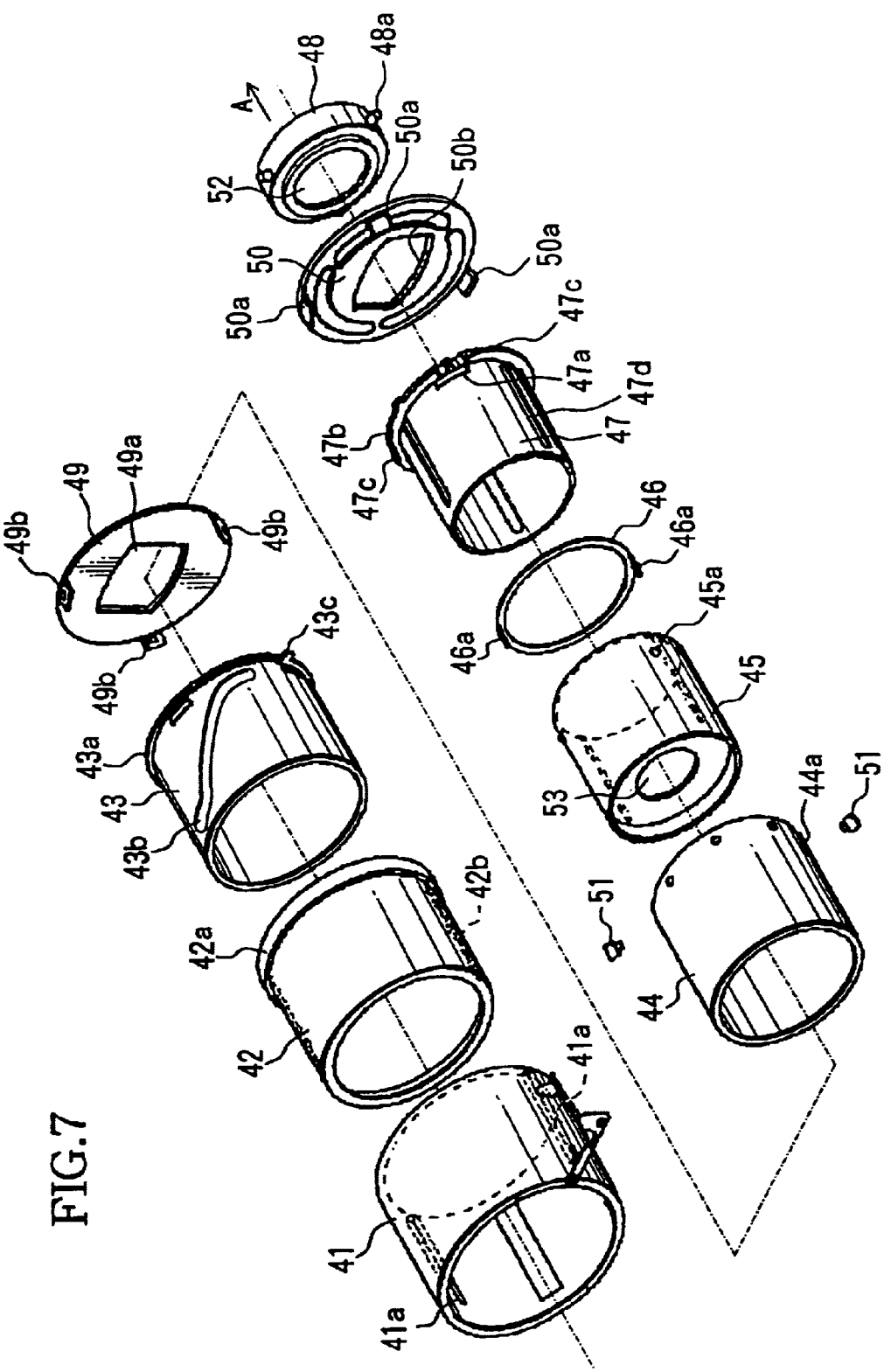
FIG. 7 is a disassembled perspective view of a lens barrel according to a third embodiment of the invention.
Figure 8:
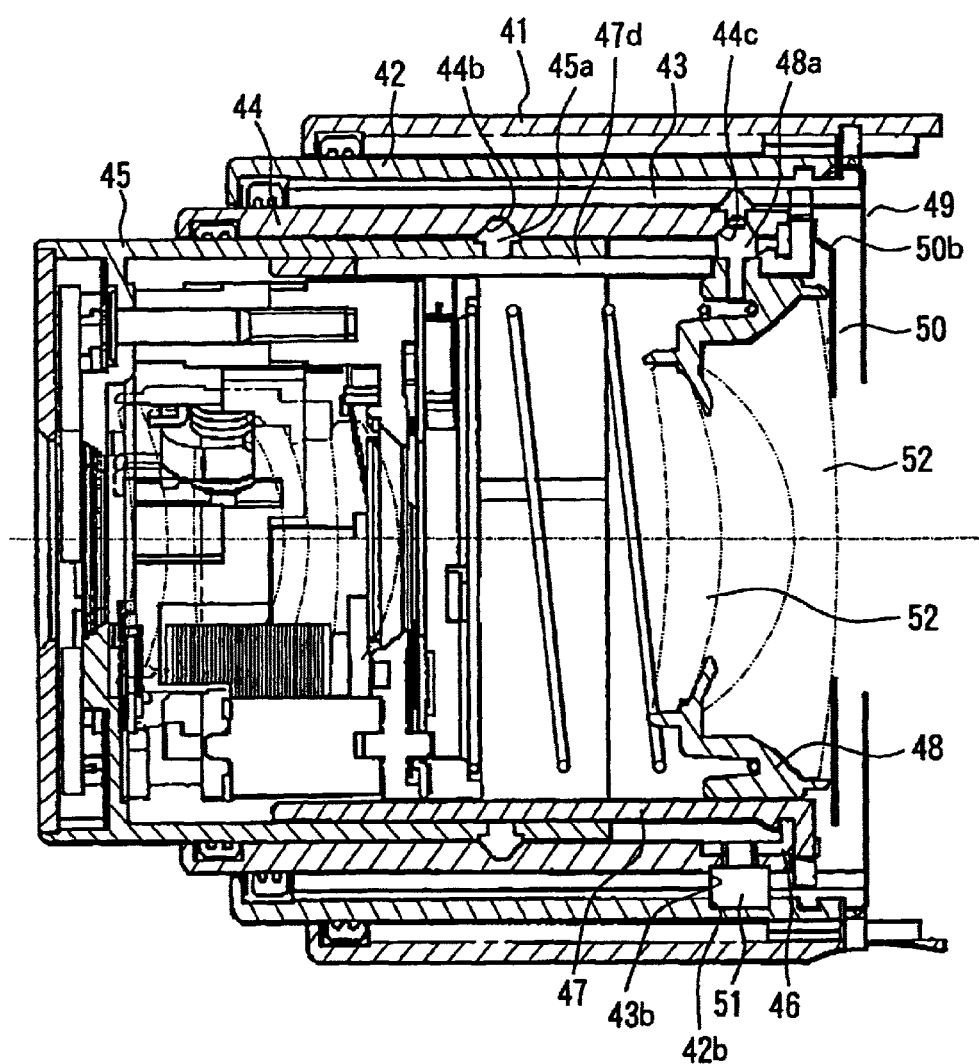
FIG. 8 is a longitudinally sectional view of a lens barrel according to the third embodiment.
Figure 9:
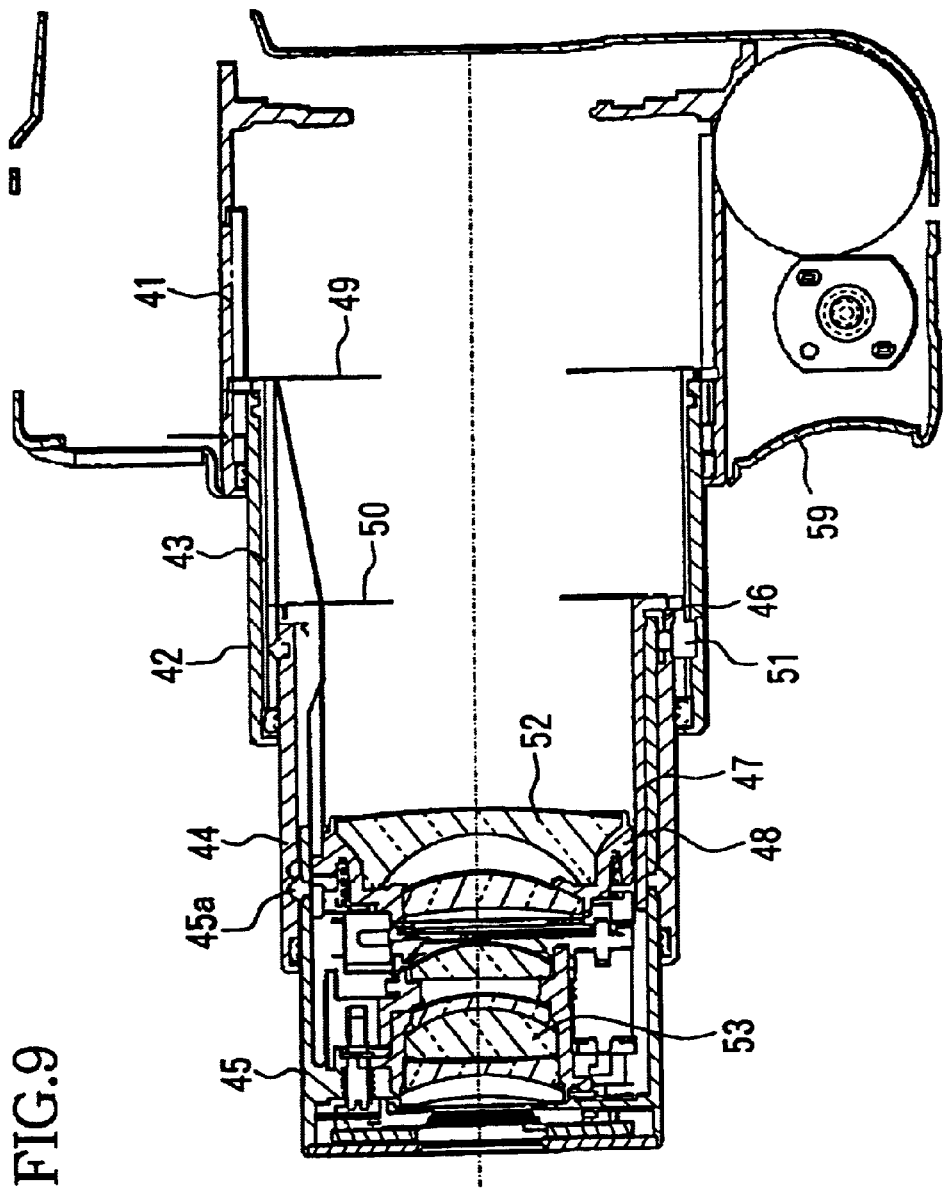
FIG. 9 is a cross-sectional view of a lens barrel according to the third embodiment.

FIG. 7 is a disassembled perspective view of a lens barrel according to another embodiment of the present invention. Also, FIG. 8 and FIG. 9 show sectional views of the lens barrel. The lens barrel is a three-stepped collapsible lens barrel that is provided with so-called two differential cam barrels.

41 denotes a fixing barrel that is fixed on the camera body 59, wherein a female helicoid is formed on the inner circumference of the fixing barrel 41, and a groove portion extending in the optical axis direction is formed.

42 denotes the first differential cam barrel. A linear groove extending in the optical axis direction is formed on the inner circumference of the first differential cam barrel 42, and a male helicoid is formed on the rear end portion of the outer circumference of the first differential cam barrel 42. The male helicoid is engaged with a female helicoid that is formed on the fixing barrel 41. The first differential cam barrel 42 is interlocked with a motor (not illustrated) via a reduction gear row, wherein the first differential barrel 42 moves in the optical axis direction, while turning around the optical axis, by engagement of the fixing barrel 41 with the helicoid upon receiving a rotation force of the motor.

43 denotes the first linear guide barrel, which is held so as to be slidable with respect to turning of the first differential cam barrel 42 inside the first differential cam barrel 42. The third cam groove 43b is formed in the circumferential direction of the first linear guide barrel 43. Also, a protrusion 43c is formed at the rear end flange portion 43a of the outer circumference of the first linear guide barrel 43, and the protrusion 43c is engaged with a groove portion 41a extending in the optical axis direction, which is formed on the inner circumference of the fixing barrel 41. Herein, if the first differential cam barrel 42 moves in the optical axis direction while turning around the optical axis, the first linear guide barrel 43 moves in only the optical axis direction without turning together with the first differential cam barrel 42 since the protrusion 43c is engaged with the groove portion 41a of the fixing barrel 41.

44 denotes the second differential cam barrel that is incorporated in the first linear guide barrel 43. An opening portion 44a in which a drive pin 51 is built is formed on the outer circumference of the second differential cam barrel 44. The drive pin 51 that is built in the opening portion 44 passes through the third cam groove 43b that is formed at the first linear guide barrel 43 and is engaged with the linear groove 42b of the first differential cam barrel 42.

45 denotes the first-group of a lens barrel that holds the first lens group 53, which is incorporated in the second linear guide barrel 47. Three first-group cam pins 45a are formed in the circumferential direction of the first-group lens barrel 45, and these first-group cam pins 45a are engaged with the first cam groove (44b in FIG. 8) that is formed on the inner circumference of the second differential cam barrel 44.

46 denotes a nut ring. The nut ring is attached so as to be rotatable around the optical axis between the claw portion 47a of the second linear guide barrel 47, which is disposed in the second differential cam barrel 44, and the rear end flange portion 47b. A nut portion 46b extending in the optical axis direction is formed on the outer circumference of the nut ring 46. Herein, the drive pin 51 is fitted in the opening portion 44a of the second differential cam barrel 44 in a state where the same passes through the nut portion 46b, whereby the second differential cam barrel 44 and the second linear guide barrel 47 move in the optical axis direction with respect to the first linear guide barrel 43 (the first differential cam barrel 42) while these are turning relatively.

48 denotes the second-group lens holder that holds the second lens group 52, which is incorporated in the second linear guide barrel 47. Three second-group cam pins 48a are formed in the circumferential direction of the second-group lens holder 48. These second-group cam pins 48a pass through a groove portion 47d, which is formed on the second linear guide barrel 47, extending in the optical axis direction, and is engaged with the second cam groove 44c that is formed on the inner circumference of the second differential cam barrel 44.

49 denotes the first flare cut plate that interrupts harmful light coming from the outside of a photographing light pass. An opening 49a that transmits a photographing light flux is formed at the middle of the first flare cut plate 49. Also, an engagement portion 49b that extends in the optical axis direction and is formed to be positive is formed in the circumferential direction of the first flare cut plate 49, and the engagement portion 49 is engaged with an engagement portion (not illustrated) that is formed at the rear end flange portion 43a of the first linear guide barrel 43, whereby the first flare cut plate 49 moves in the optical axis direction integrally with the first linear guide barrel 43.

50 denotes the second flare cut plate that interrupts harmful light coming from the outside of the photographing light pass. An opening portion 50b that transmits a photographing light flux is formed at the middle of the second flare cut plate 50. Also, an engagement portion 50a is formed in the circumferential direction of the second flare cut plate 50, and the claw portion 47c that is formed at the rear end flange portion 47 of the second linear guide barrel 47 is engaged with the engagement portion 50a, wherein the second flare cut plate 50 moves in the optical axis direction integrally with the second linear guide barrel 47.

Figure 10:
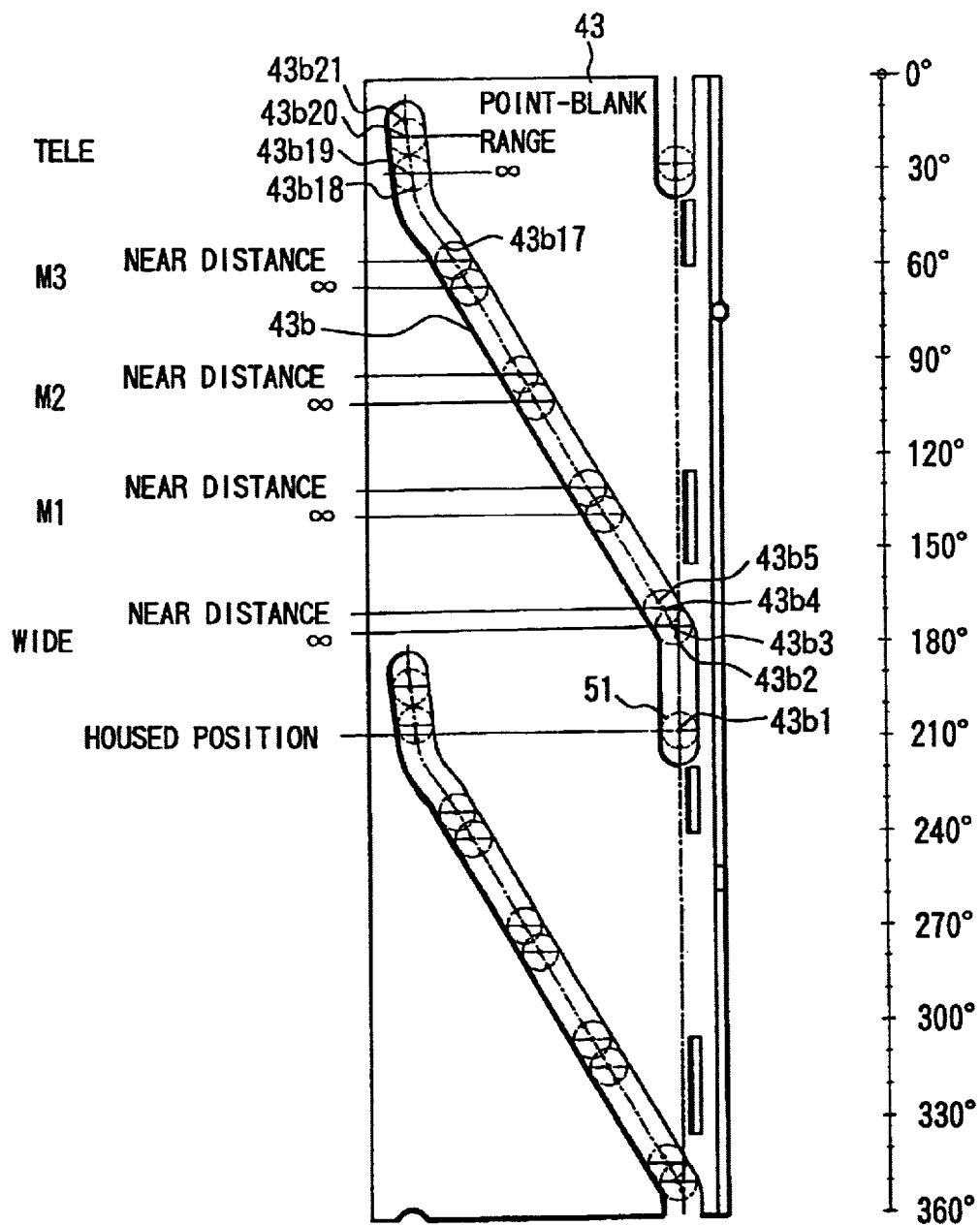
FIG. 10 is a developed view of a first linear guide barrel 43.
Figure 11:
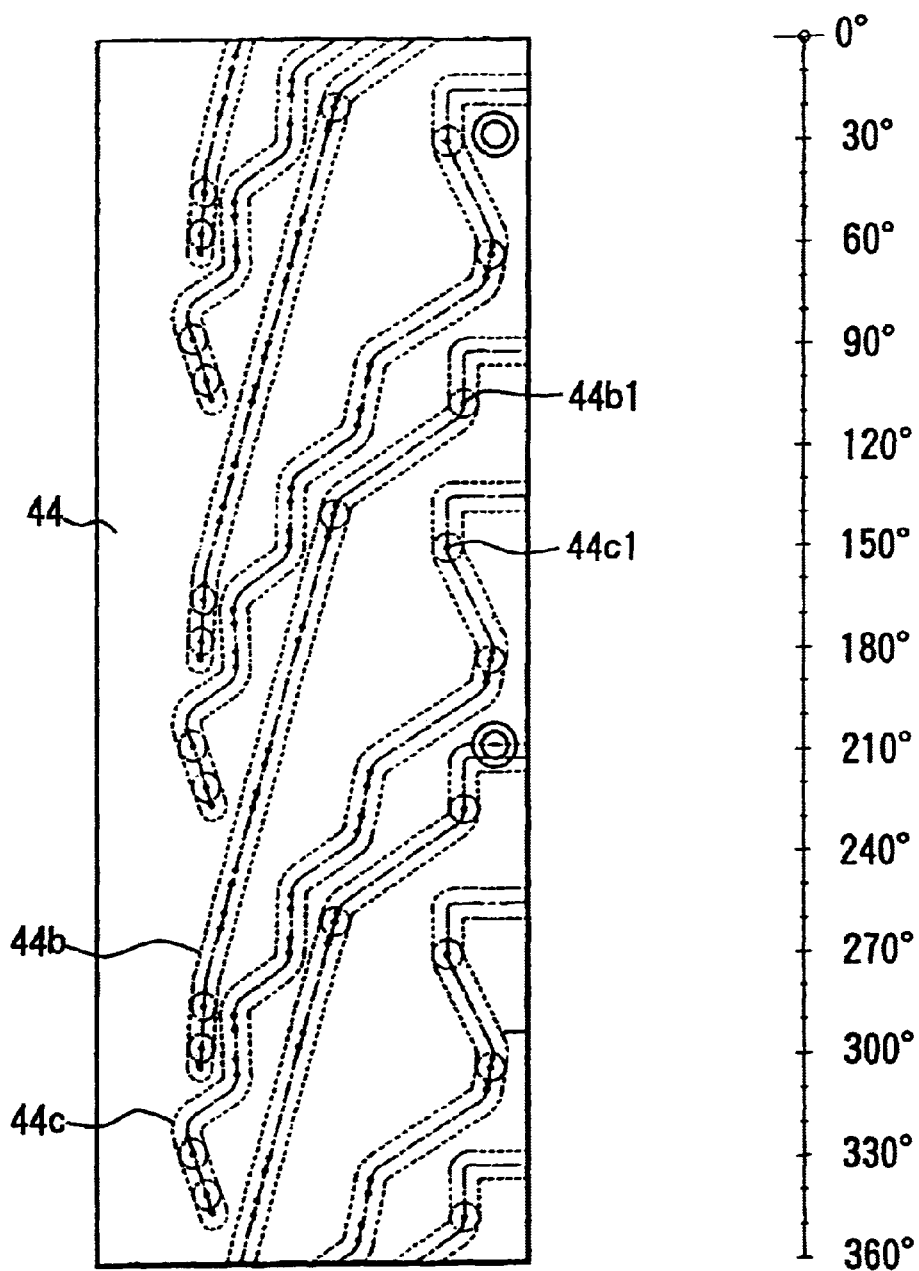
FIG. 11 is a developed view of a second differential cam barrel 44.
Figure 12:
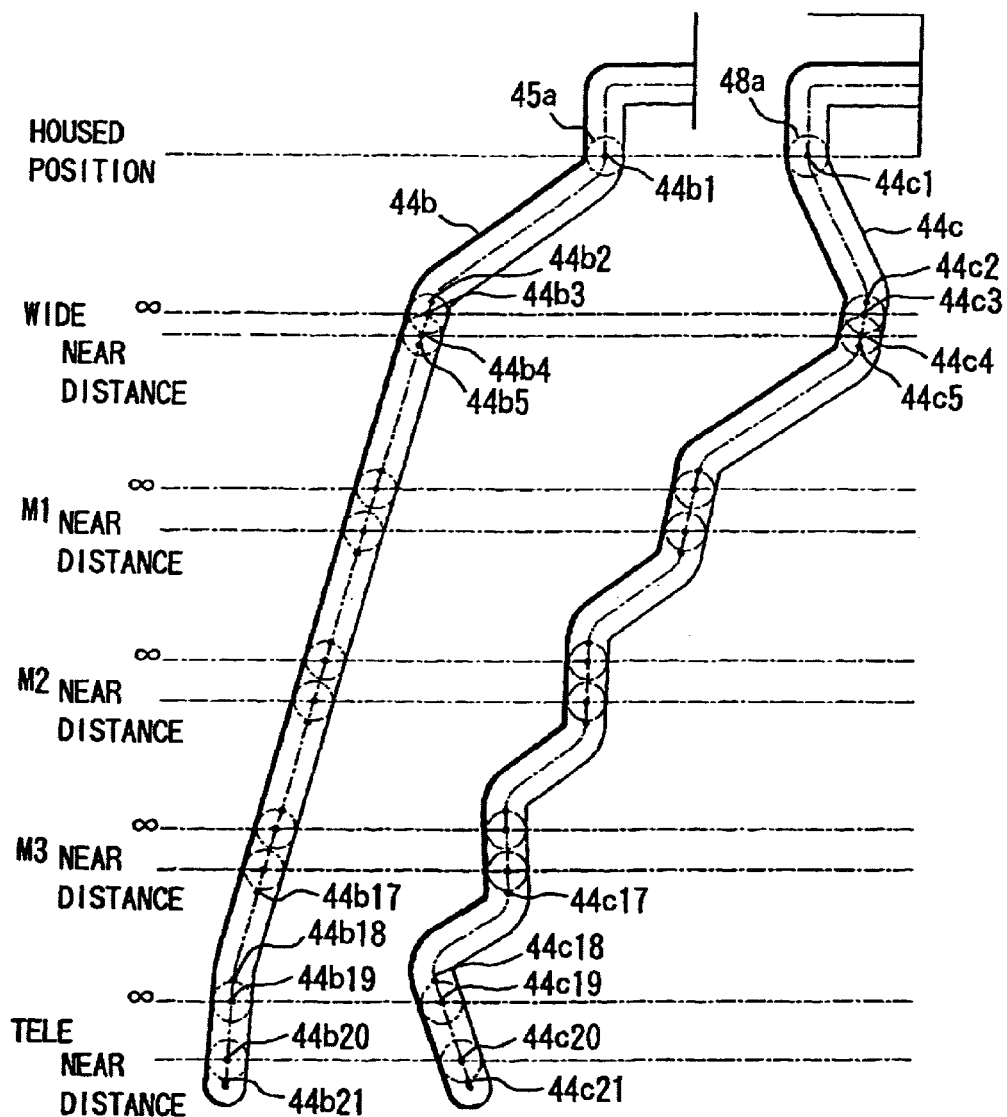
FIG. 12 is a partially developed view of the second differential cam barrel 44.
Figure 13:
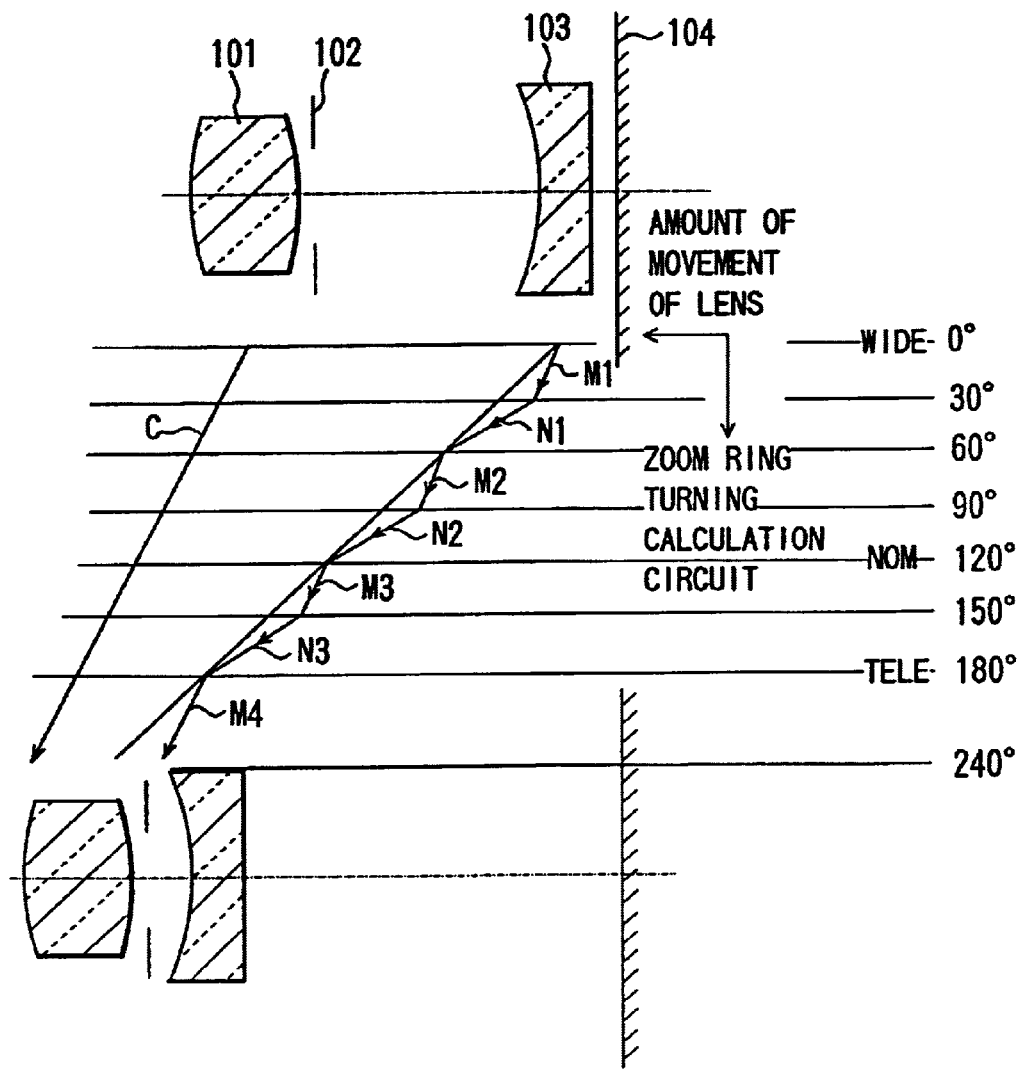
FIG. 13 is an exemplary view showing movement of a photographic lens according to a prior art.
Figure 14:
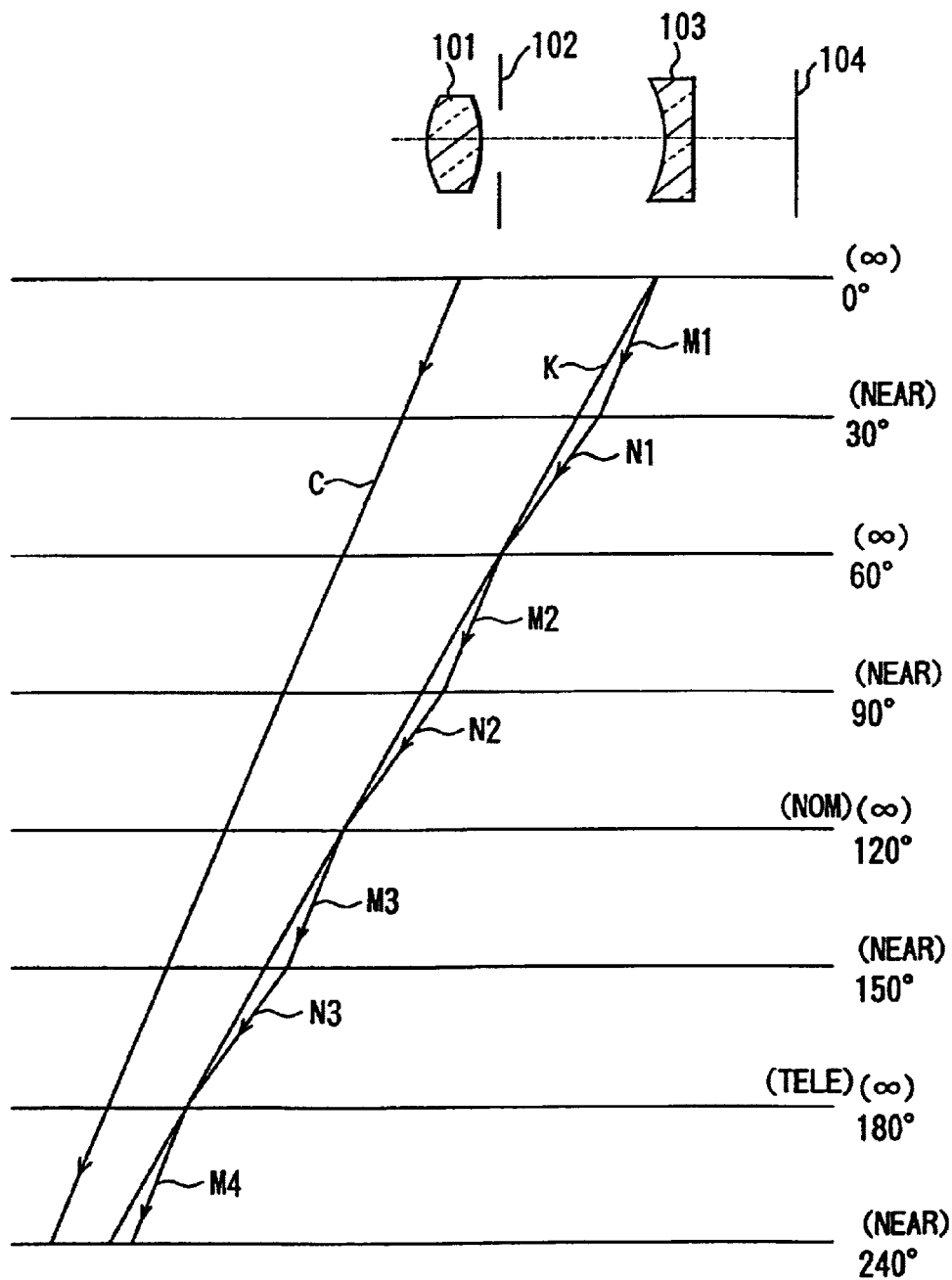
FIG. 14 is an exemplary view showing movement of a photographic lens according to the prior art.

Next, a description is given of zooming and focusing of a camera provided with a lens barrel according to the present embodiment with reference to FIG. 8 through FIG. 12. Herein, FIG. 8 is a sectional view of a lens barrel at WIDE, and FIG. 9 is a sectional view of a lens barrel at TELE. Also, FIG. 10 is a developed view of the first linear guide barrel 43, FIG. 11 is a developed view of the second differential cam barrel 44, and FIG. 12 is a partially developed view of the second differential cam barrel 44.

First, a description is given of the housed condition of the lens barrel. The first differential cam barrel 42 that is helicoid-engaged with the fixing barrel 41 doesn't protrude from the front side of the fixing barrel 41. The drive pin 51 of the second differential cam barrel 44 is engaged with the third cam groove 43b that is formed on the inner circumference of the first linear guide barrel 43, and is disposed at a position 43b1 of the third cam groove 43b.

The three first-group cam pins 45a that are formed in the circumferential direction of the first-group lens barrel 45 to hold the first lens group are engaged with the first cam groove 44b, which is formed on the inner circumference of the second differential cam barrel 44, and are located at a position 44b1 of the second cam groove 44b. At this time, the first-group lens barrel 45 doesn't protrude with respect to the second differential cam barrel 44.

Three second-group cam pins 48a that are formed in the circumferential direction of the second-group lens holder 48 to hold the second lens group 52 are engaged with the second cam groove 44c that are formed on the inner circumference of the second differential cam barrel 44, and are disposed at a position 44c1 of the third cam groove 44c.

Next, a description is given of a motion when the lens barrel protrudes from the housed condition to WIDE standby condition (FIG. 8).

When a photographer turns on the power source of the camera body 59, the motor is turned, and a drive force of the motor is transmitted to the first differential cam barrel 42, wherein the first differential cam barrel 42 protrudes in the optical axis direction, while turning around the optical axis, by helicoid engagement with the fixing barrel 41. At this time, the drive pin 51 of the second differential cam barrel 44 is guided by the third cam groove 43b and moves from the position 43b1 to the position 43b2. Thereby, the second differential cam barrel 44 protrudes with respect to the first linear guide barrel 43 while turning the optical axis. Herein, the amount of protrusion of the second differential cam barrel 44 is equivalent to the amount of movement of the drive pin 51 in the optical axis direction between the position 43b1 and the position 43b2.

When the second differential cam barrel 44 protrudes while turning around the optical axis, the first-group cam pin 45a of the first-group lens barrel 45 is guided by the first cam groove 44b and moves from the position 44b1 to the position 44b2, whereby the first-group lens barrel 45 protrudes equivalent to the amount of movement of the first-group cam pin 45a in the optical axis direction between the position 44b1 and the position 44b2 with respect to the second differential cam barrel 44. In addition, the second-group cam pin 48a of the second-group lens holder 48 is guided by the second cam groove 44c and moves from the position 44c1 to the position 44c2, whereby the second-group lens holder 48 protrudes equivalent to the amount of movement of the second-group cam pin 48a in the optical axis direction between the position 44c 1 and the position 44c2 with respect to the second differential cam barrel 44. With the above-described operation, the lens barrel is made into a WIDE standby condition (FIG. 8).

In the WIDE standby condition, if the photographer presses a release button to the first stroke, the subject distance is measured by the photometric portion (not illustrated) that is disposed in the camera body 59, and the focusing adjustment is carried out subject to the subject distance.

Where the focusing adjustment is carried out, first a drive force of the motor is transmitted to the first differential cam barrel 42, and the first differential cam barrel 42 protrudes in the optical axis direction while turning around the optical axis due to helicoid engagement with the fixing barrel 41. At this time, the drive pin 51 of the second differential cam barrel 44 is guided by the third cam groove 43b and is caused to move in the optical axis direction, wherein since the drive pin 51 moves to the position responsive to an amount of rotation of the motor (that is, an amount of rotation of the first differential cam barrel 42) between the position 43b3 (∞ position) and the position 43b4 (the near distance), the second differential cam barrel 44 protrudes in the optical axis direction.

By protruding of the second differential cam barrel 44, the first-group cam pin 45a of the first-group lens barrel 45 is guided by the first cam groove 44b and is caused to move to the position responsive to the amount of protrusion of the second differential cam 44 between the position 44b3 (∞ position) and the position 44b4 (the near distance), whereby the first-group lens barrel 45 protrudes in the optical axis direction. Also, the second-group cam pin 48a of the second-group lens holder 48 is guided by the second cam groove 44c and is caused to move to the position responsive to the amount of protrusion of the second differential cam barrel 44 between the position 44c3 (∞ position) and the position 44c4 (the near distance), whereby the second-group lens holder 48 protrudes in the optical axis direction.

With the above-described operation, the first lens group 53 that is held by the first-group lens barrel 45 and the second lens group 52 that is held by the second-group lens holder 48 are, respectively, moved in the optical axis direction to carry out focusing adjustment. And, if a photographer presses the release button to the second stroke, an exposure operation is executed by opening and closing operations of the shutter blades that are disposed in the lens barrel. After the exposure is finished, the first differential cam barrel 42 is reversely turned by driving the motor to stow the lens barrel to the WIDE standby position, and the film is wound, whereby photographing is completed with respect to one frame of the film, and the camera is reset to a condition before commencement of photographing.

Next, a description is given of movement for protruding the lens barrel from the housed condition to the TELE standby condition (FIG. 9).

If a photographer sets the zoom switch, which is provided on the camera body 59, to the TELE by operating the same, the motor begins to rotate, and the drive force of the motor is transmitted to the first differential cam barrel 42, whereby the first differential cam barrel 42 protrudes in the optical axis direction by helicoid engagement with the fixing barrel 41 while turning around the optical axis. At this time, the drive pin 51 of the second differential cam barrel 44 is guided by the third cam groove 43b and is caused to move from the position 43b1 to the position 43b18. Thereby, the second differential cam barrel 44 protrudes with respect to the first linear guide barrel 43 while turning around the optical axis. Herein, the amount of protrusion of the second differential cam barrel 44 is equivalent to the amount of the drive pin 51 in the optical axis direction between the position 43b1 and the position 43b18.

Since the second differential cam barrel 44 protrudes, the first-group cam pin 45a of the first-group lens barrel 45 is guided by the first cam groove 44b and is caused to move from the position 44b1 to the position 44b18, whereby the first-group lens barrel 45 protrudes equivalently to the amount of movement of the first-group cam pin 45a in the optical axis direction between the position 44b1 and the position 44b18. Also, the second-group cam pin 48a of the second-group lens holder 48 is guided by the second cam groove 44c and is caused to move from the position 44c1 to the position 44c18, whereby the second-group lens holder 48 protrudes equivalently to the amount of movement of the second-group cam pin 48a in the optical axis direction between the position 44c1 and the position 44c18 with respect to the second differential cam barrel 44. By the above described movement, the lens barrel is made into the TELE standby condition (FIG. 9).

If a photographer presses the release button to the first stroke in the TELE standby condition, the subject distance is measured by a photometric portion (not illustrated) that is disposed in the camera body 59, and focusing adjustment is carried out subject to the subject distance. Where the focusing adjustment is carried out, first, a drive force of the motor is transmitted to the first differential cam barrel 42, and the first differential cam barrel 42 protrudes in the optical axis direction by helicoid engagement with the fixing barrel 41 while turning around the optical axis. At this time, the drive pin 51 of the second differential cam barrel 44 is guided by the third cam groove 43b and is caused to move in the optical axis direction. Since the drive pin is caused to move to a position responsive to the amount of rotation of the motor (that is, the amount of turning of the first differential cam barrel 42) between the position 43b19 (∞ position) and the position 43b20, the second differential cam barrel 44 protrudes in the optical direction.

By protruding of the second differential cam barrel 44, the first-group cam pin 45a of the first-group lens barrel 45 is guided by the first cam groove 44b and is caused to move to a position responsive to the amount of protrusion of the second differential cam 44 between the position 44b19 and the position 44b20, whereby the first-group lens barrel 45 protrudes in the optical axis direction. Also, the second-group cam pin 48a of the second-group lens holder 48 is guided by the second cam groove 44c and is caused to move to a position responsive to the amount of protrusion of the second differential cam barrel 44 between the position 44c19 (∞ position) and the position 44c20 (the point-blank position), whereby the second-group lens holder 48 is stowed.

With the above described operations, the first lens group 53 that is held at the first-group lens barrel 45 and the second lens group 52 that is held by the second-group lens holder 48 are, respectively, moved in the optical axis direction, and focusing adjustment is carried out. And, if the photographer presses the release button to the second stroke, an exposure operation is carried out by opening and closing operations of the shutter blades disposed in the lens barrel. After the exposure is completed, the first differential cam barrel 42 is reversely turned by driving the motor and the lens barrel is stowed to the TELE standby condition, and simultaneously, a film is wound, whereby the photographing is carried out with respect to one frame of the film, and the camera is reset to its original condition before commencement of photographing.

Herein, the amount of protrusion of the second differential cam barrel 44 (that is, the amount of movement in the optical axis direction from the position 43b19 to the position 43b20) with respect to the first linear guide barrel 43 (the first differential cam barrel 42) when carrying out focusing adjustment at the TELE is further decreased than the amount of proturison of the second differential cam barrel 44 when carrying out focusing adjustment at other zoom positions (WIDE, M1, M2, and M3). That is, the amount of cam lift, in the optical axis direction, of the focusing adjustment areas (43b19 through 43b20) of the third cam groove 34b that drives the second differential cam barrel 44 at the TELE is made smaller than the amount of cam lift, in the optical axis direction, of the focusing adjustment areas of the third cam groove 43b at other zoom positions. Thereby, it is possible to shorten the length of the first linear guide barrel 43, in the optical axis direction, in which the third cam groove 43b to guide the second differential cam barrel 44 in the optical axis direction is formed. Similarly, the amount of proturusion of the first lens barrel 45 (the amount of movement in the optical axis direction from the position 44b19 to the position 44b20) when carrying out focusing adjustment at the TELE is made smaller than the amount of protrusion of the first-group lens barrel 45 when carrying out the focusing adjustment at other zoom positions (WIDE, M1, M2 and M3). That is, the amount of cam lift, in the optical axis direction, of the focusing adjustment areas (44b19 through 44b20) of the first cam groove 44b that drives the first lens barrel 45 at the TELE end is made smaller than the amount of cam lift, in the optical axis direction, of the focusing adjustment areas of the first cam groove 44b at other zoom positions, whereby it is possible to shorten the length of the second differential cam barrel 44, in the optical axis direction, in which the second cam groove 44b to guide the first lens barrel 45 in the optical axis direction is formed.

Thus, since it is possible to shorten the length, in the optical axis direction, of the first linear guide barrel 43 and the second differential cam barrel 44, the lens barrel can be made small-sized. In addition, since the amount of protrusion of the lens barrel where focusing adjustment is carried out at the TELE is decreased, it is possible to easily handle the lens barrel.

On the other hand, the amount of movement of the second-group lens holder 48 in the optical axis direction when carrying out focusing adjustment at the TELE is set with respect to the amount of movement of the first-group lens barrel 45 in the optical axis direction so that the lens focusing is set from ∞ to the near distance. That is, in the present embodiment, the second-group lens holder 48 is stowed (in a range from the position 44c19 to the position 44c20).

According to the above described respective embodiments, in the first cam that guides the first lens group, which is positioned nearest to the subject side, in the optical axis direction, since the amount of lift of the focusing area in the optical axis direction at the TELE end is made smaller than the amount of lift of the focusing area at other zoom positions in the optical axis direction, it is possible to shorten the length of the cam barrel, in the optical axis direction, in which the first cam is formed, whereby the lens barrel can be made small-sized. In addition, it is possible to reduce the amount of protrusion of the lens barrel when carrying out focusing from infinity to the near distance at the TELE, and it becomes possible to easily handle the lens barrel.

Further, in the above-described respective embodiments, the description was given of a film camera that records a subject image on silver film. However, the present invention is applicable to a digital camera in which an image pick-up device such as CCD is disposed on an image plane and a subject image is picked up.

What is claimed is:

1. A variable power lens barrel comprising a first lens unit that is positioned nearest to the object side, and a cam barrel having a first cam, wherein the first cam alternately and continuously has a plurality of variable power cam portions that drive said first lens unit for varying power thereof in the optical axis direction and a plurality of focus cam portions that drive said first lens unit driven by the respective variable power cam portions for focusing in the optical axis direction, and an amount of lift of the focus cam portion of said first cam, which drives said first lens unit, in the optical axis direction at the telephoto end is smaller than an amount of lift of the focus cam portion of said first cam, which drives said first lens unit, in the optical axis direction at other variable power positions from the wide angle end to the telephoto end.

2. The variable power lens barrel according to claim 1 comprising a second lens unit that is positioned at the image plane side nearer than said first lens unit, wherein the second cam is formed in said cam barrel, and the second cam alternately and continuously has a plurality of variable power cam portions that drive said second lens unit for varying power thereof in the optical axis direction and a plurality of focus cam portions that drive said second lens unit driven by the respective variable power cam portions for focusing in the optical axis direction, and wherein an amount of lift of the focusing cam portion of said second cam, which drives said second lens unit, in the optical axis direction at the telephoto end is smaller than an amount of lift of the focus cam portion of said second cam, which drives said second lens unit, in the optical axis direction at other variable power positions.

3. The variable power lens barrel according to claim 1 comprising a second lens unit that is positioned at the image plane side nearer than said first lens unit, wherein said second cam is formed in said cam barrel, and said second cam alternately and continuously has a plurality of variable power cam portions that drive said second lens unit for varying power thereof in the optical axis direction and a plurality of focus cam portions that drive said second lens unit driven by the respective variable power cam portions for focusing in the optical axis direction, and wherein the focusing cam portion of the second cam that drives said second lens unit at the telephoto end drives said second lens unit at a nearer image plane side than the position of said second lens unit that has been driven to the telephoto end by the variable cam portion of said second cam.

4. The variable power lens barrel according to claim 2 comprising an operation unit that varies power in response to an operation made by a user; a signal output circuit that outputs an electric signal in order to carry out focusing in response to a object distance; and a drive unit for driving said cam barrel in response to an operation of said operation unit and electric signal from said signal outputting circuit; wherein said drive unit drives said cam barrel so that, in response to operations of said operation unit, said first lens unit and said second lens unit, respectively, move to a position of varying the power, corresponding to an operation position of said operation unit by said first cam and said second cam, and said drive unit drives said cam barrel so that said first lens unit and said second lens unit, respectively, move to a focusing position in response to an electric signal that is outputted from said signal outputting circuit.

5. The variable power lens barrel according to claim 1, in which said cam barrel is movable in the optical axis direction, further comprising a drive member having a third cam, wherein said third cam alternately and continuously has a plurality of variable power cam portions that drive said cam portion for varying the power in the optical axis direction, and a plurality of focusing cam portions that drive the cam barrel driven by the respective variable power cam portions for focusing in the optical axis direction, and wherein the amount of lift of the focusing cam portion of said third cam in the optical axis direction, which drives said cam barrel at the telephoto end, is smaller than the amount of lift of the focusing cam portion of said third cam, which drives said cam barrel at other power varying positions.

6. A camera comprising a shooting lens, wherein said shooting lens is a variable power lens barrel set forth in any one of claims 1 through 5, and said shooting lens forms a subject image on a silver film or an image pick-up device.

* * * * *

UNITED STATES PATENT AND TRADEMARK OFFICE
CERTIFICATE OF CORRECTION

PATENT NO. : 6,650,832 B2  Page 1 of 1
DATED : November 18, 2003
INVENTOR(S) : Shinichi Masuda It is certified that error appears in the above-identified patent and that said Letters Patent is hereby corrected as shown below:

Column 11,
Lines 46-65, delete and insert the following table:

| Focal length of lens (f) | Output signal from the zooming signal processing circuit 15 | Output signal from the subject distance detecting circuit 14 | | Input signal into the comparator 12a |
|---|---|---|---|---|
| 35mm | 10 | 8m | 0 | 10 |
|  |  | 4m | 1 | 11 |
|  |  |  | - | - |
|  |  | 0.6m | 9 | 14 |
| 40mm | 20 | 8m | 0 | 20 |
|  |  |  | - | - |
|  |  | 0.6m | 9 | 29 |
| 50mm | 30 | 8m | 0 | 30 |
|  |  |  | - | - |
|  |  | 0.6m | 9 | 39 |
| 70mm | 40 | 8m | 0 | 40 |
|  |  | 4m | 1 | 41 |
|  |  |  | - | - |
|  |  | 0.6m | 9 | 49 |
| 105mm | 50 | 8m | 0 | 50 |
|  |  |  | - | - |
|  |  | 0.6m | 9 | 59 |

Column 12,
Line 33, delete "of f" and insert -- off --.

Signed and Sealed this

Twenty-eighth Day of March, 2006

JON W. DUDAS
*Director of the United States Patent and Trademark Office*